US012112678B2

(12) United States Patent
Knausz et al.

(10) Patent No.: US 12,112,678 B2
(45) Date of Patent: Oct. 8, 2024

(54) HYBRID PULSE-WIDTH-MODULATION PIXELS

(71) Applicant: X Display Company Technology Limited, Dublin (IE)

(72) Inventors: Imre Knausz, Fairport, NY (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 17/822,962

(22) Filed: Aug. 29, 2022

(65) Prior Publication Data

US 2024/0071279 A1 Feb. 29, 2024

(51) Int. Cl.

| | |
|---|---|
| ***G09G 3/20*** | (2006.01) |
| ***G09G 3/3233*** | (2016.01) |
| *G09G 3/32* | (2016.01) |
| *G09G 3/36* | (2006.01) |

(52) U.S. Cl.

CPC ......... *G09G 3/2018* (2013.01); *G09G 3/3233* (2013.01); *G09G 3/32* (2013.01); *G09G 3/36* (2013.01); *G09G 2310/08* (2013.01); *G09G 2330/02* (2013.01)

(58) Field of Classification Search

CPC .. G09G 3/30; G09G 2310/066; G09G 3/2003; G09G 3/2007; G09G 3/2085

See application file for complete search history.

(56) References Cited

U.S. PATENT DOCUMENTS

| | | | | |
|---|---|---|---|---|
| 7,622,367 | B1 | 11/2009 | Nuzzo et al. | |
| 8,120,555 | B2 * | 2/2012 | Cok | G09G 3/3233 345/55 |
| 8,506,867 | B2 | 8/2013 | Menard | |
| 8,722,458 | B2 | 5/2014 | Rogers et al. | |
| 8,889,485 | B2 | 11/2014 | Bower | |
| 9,640,108 | B2 | 5/2017 | Cok et al. | |
| 9,928,771 | B2 * | 3/2018 | Cok | G09G 3/3233 |
| 10,157,563 | B2 * | 12/2018 | Cok | F21K 9/90 |
| 10,360,846 | B2 * | 7/2019 | Cok | G09G 3/2014 |
| 10,388,205 | B2 * | 8/2019 | Cok | G09G 3/2003 |
| 10,755,614 | B2 * | 8/2020 | Kagawa | G09G 3/002 |
| 10,823,609 | B2 | 11/2020 | Simeone | |
| 11,430,375 | B1 | 8/2022 | Meitl et al. | |

(Continued)

OTHER PUBLICATIONS

Cok, R. S et al., AMOLED displays with transfer-printed integrated circuits, Journal of SID, 19(4):335-341, (2011).

*Primary Examiner* — Olga V Merkoulova

(74) *Attorney, Agent, or Firm* — Choate, Hall & Stewart LLP; Michael D. Schmitt

(57) ABSTRACT

A hybrid pulse-width-modulation pixel includes a light controller responsive to a variable power signal specifying different powers and a pixel controller. The pixel controller is operable receive a pixel luminance signal comprising multiple bits specifying a desired light-controller luminance, generate the variable power signal in response to the pixel luminance signal, and drive the light controller to emit light at different luminances in response to the variable power signal for different time periods. The pixel controller is operable to provide the variable power signal at a constant first power for a first time period and provide the variable power signal at a constant second power different from the constant first power for a second time period.

20 Claims, 31 Drawing Sheets

(56) References Cited

U.S. PATENT DOCUMENTS

| | | | | |
|---|---|---|---|---|
| 11,551,605 | B2 * | 1/2023 | Kim | G09G 3/2014 |
| 11,935,456 | B2 * | 3/2024 | Kim | G09G 3/2014 |
| 2009/0115703 | A1 * | 5/2009 | Cok | G09G 3/3233<br>345/76 |
| 2016/0093600 | A1 | 3/2016 | Bower et al. | |
| 2017/0061867 | A1 * | 3/2017 | Cok | G09G 3/2022 |
| 2017/0330509 | A1 * | 11/2017 | Cok | G09G 3/2014 |
| 2018/0197471 | A1 * | 7/2018 | Rotzoll | G09G 3/2003 |
| 2019/0347980 | A1 * | 11/2019 | Kuo | G09G 3/32 |
| 2019/0371218 | A1 * | 12/2019 | Kagawa | G09G 3/3607 |
| 2021/0210002 | A1 * | 7/2021 | Kim | G09G 3/2014 |
| 2023/0154387 | A1 * | 5/2023 | Lee | G09G 3/2022<br>345/55 |

* cited by examiner

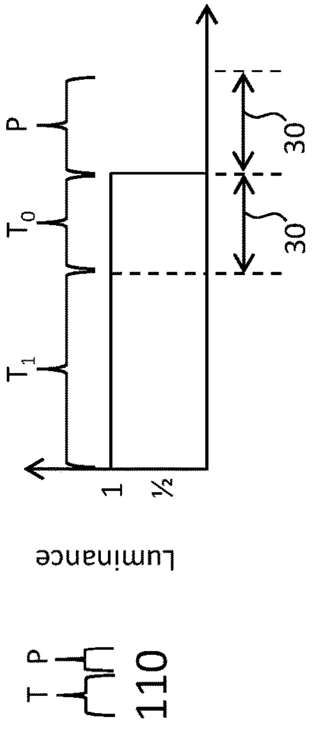
FIG. 7G
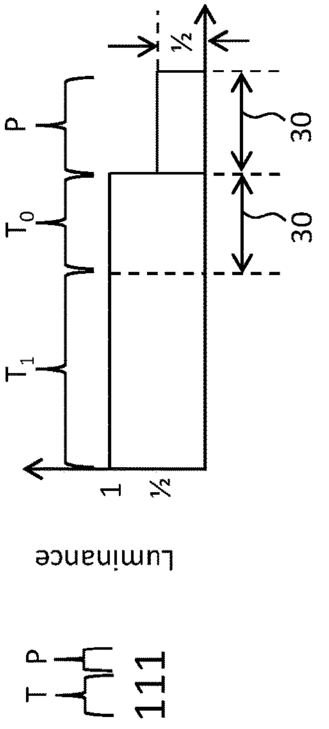
FIG. 7H1
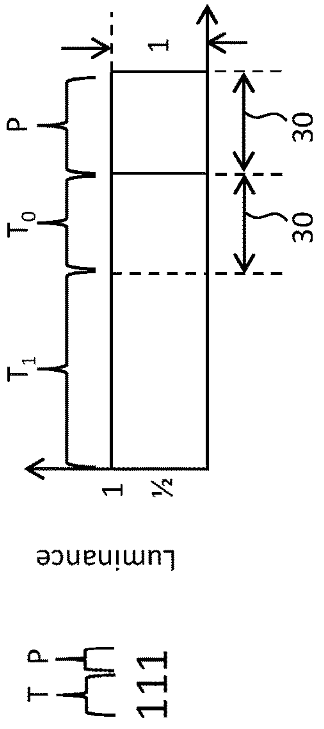
FIG. 7H2

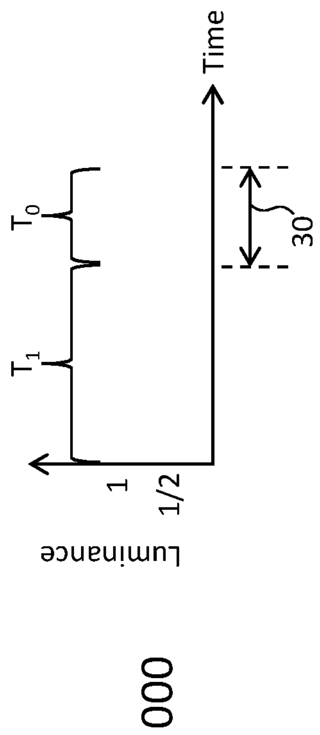
FIG. 11A
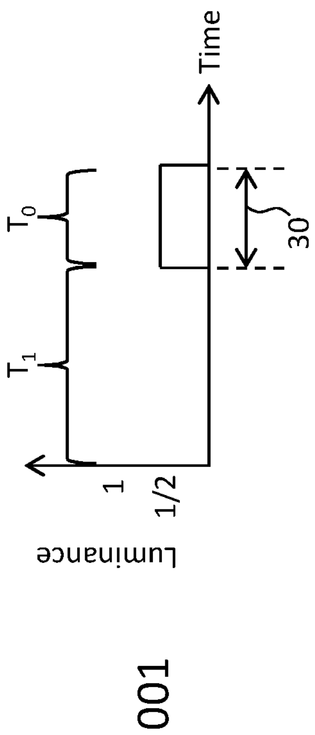
FIG. 11B
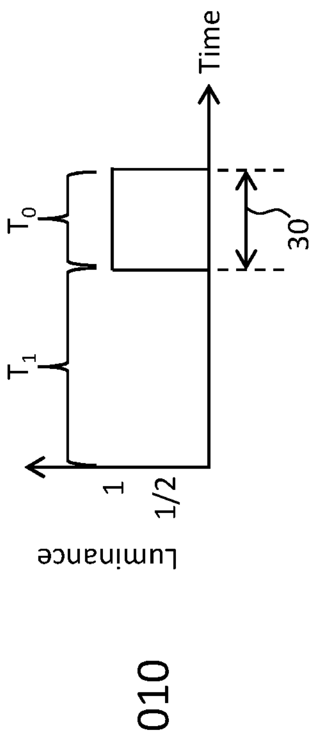
FIG. 11C1

FIG. 11C2
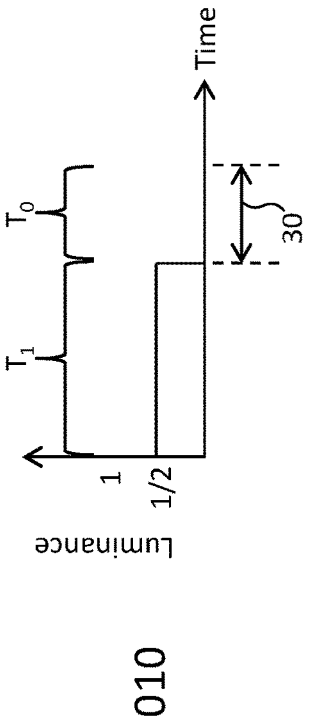
FIG. 11D
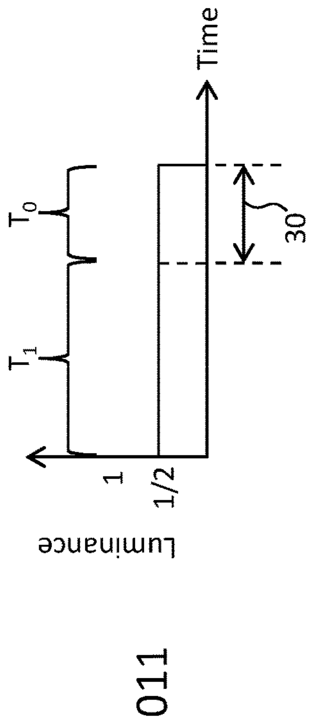
FIG. 11E1
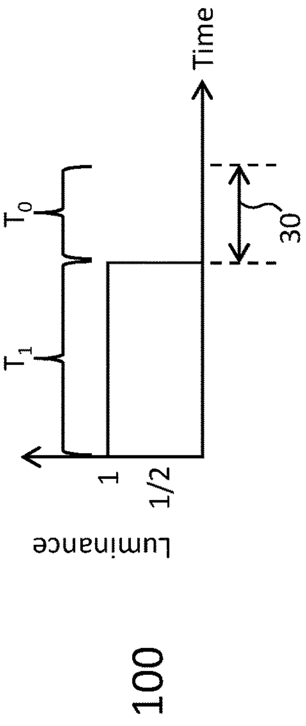

FIG. 11E2

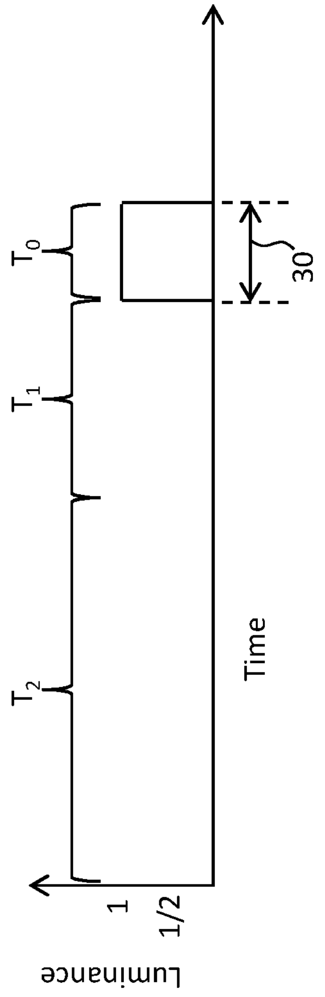
0010
FIG. 12C1
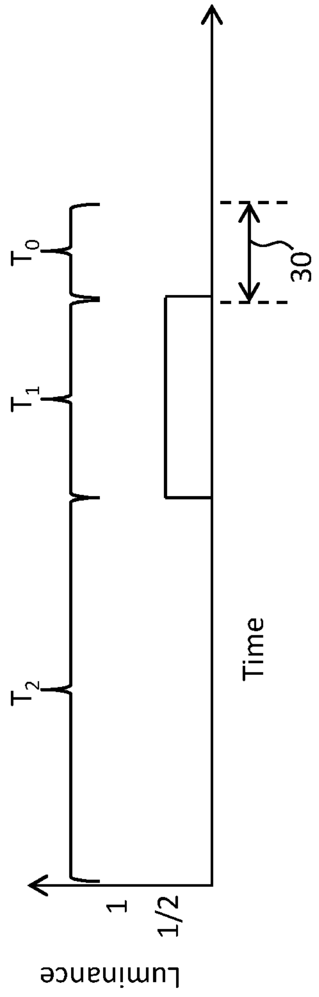
0010
FIG. 12C2

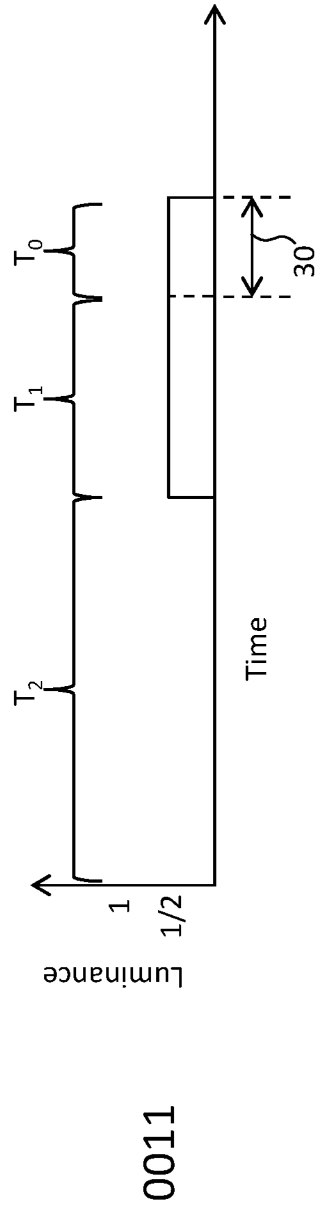
FIG. 12D
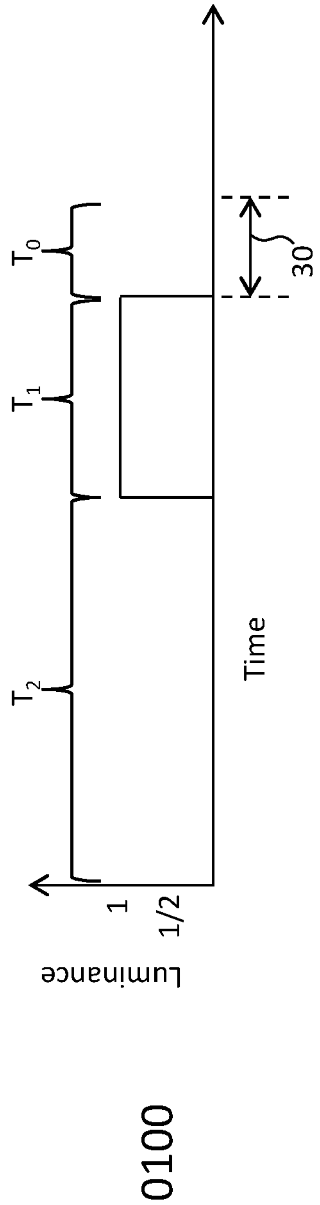
FIG. 12E1
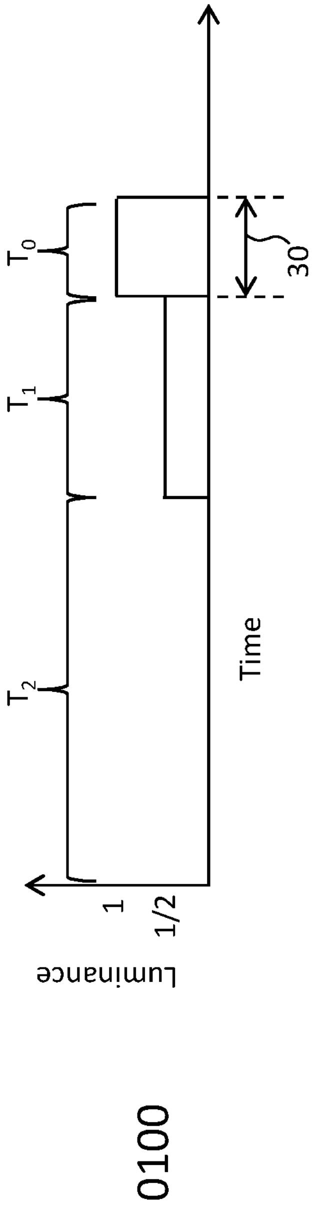
FIG. 12E2

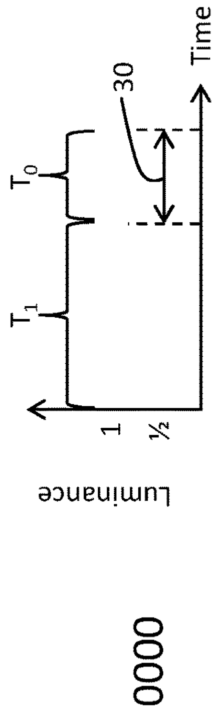
*FIG. 13A*
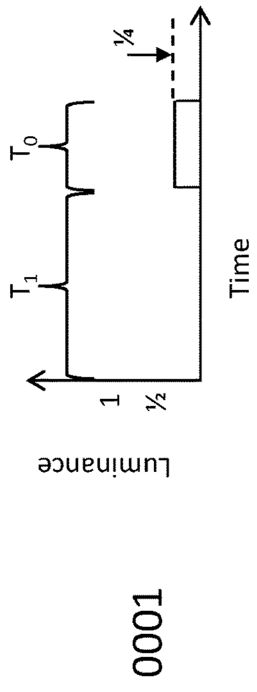
*FIG. 13B*
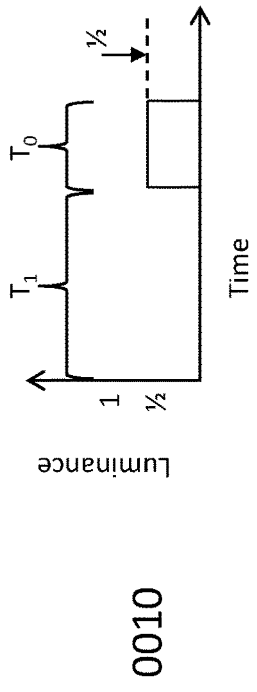
*FIG. 13C*
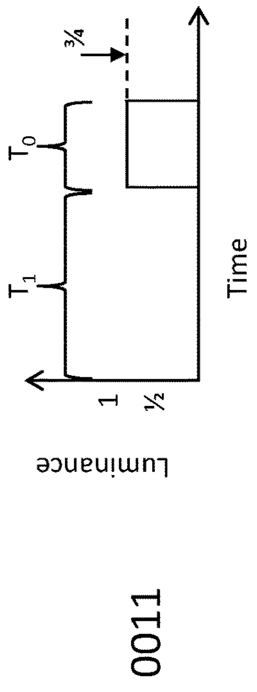
*FIG. 13D1*

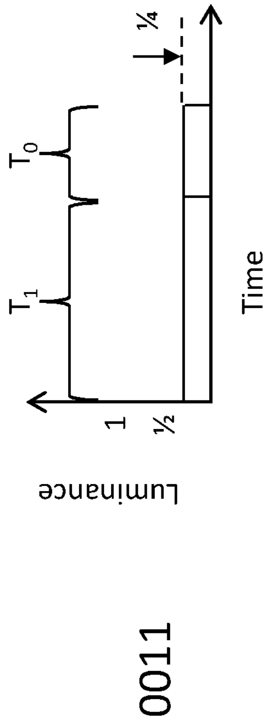
FIG. 13D2
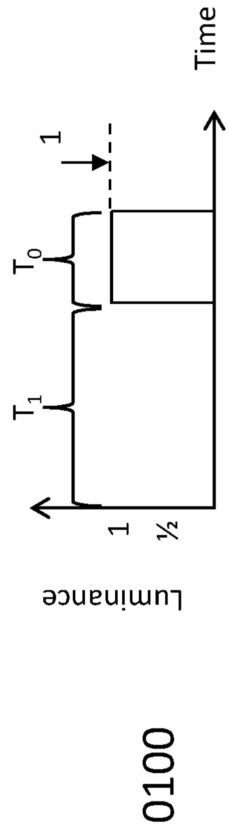
FIG. 13E1
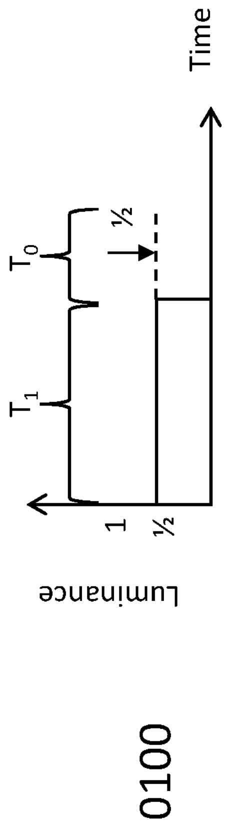
FIG. 13E2

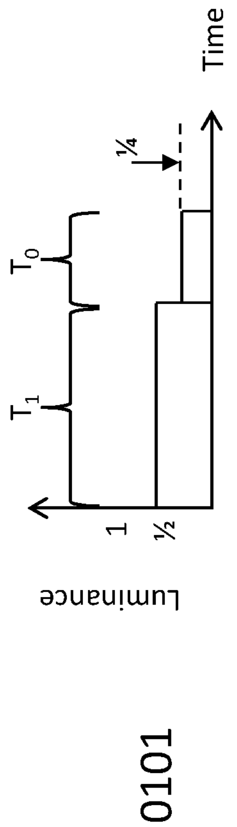
FIG. 13F
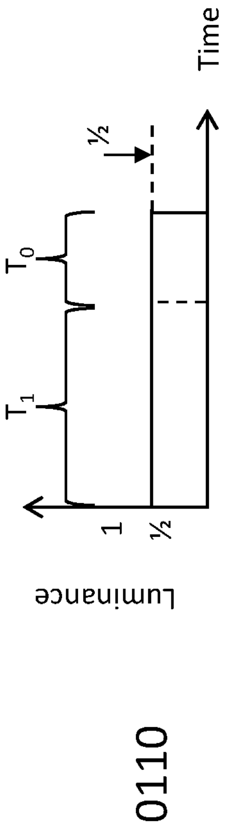
FIG. 13G1
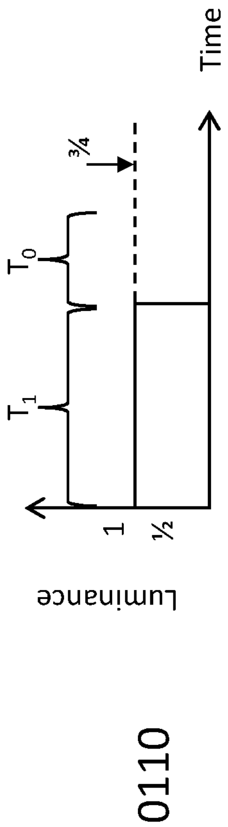
FIG. 13G2

FIG. 13H1
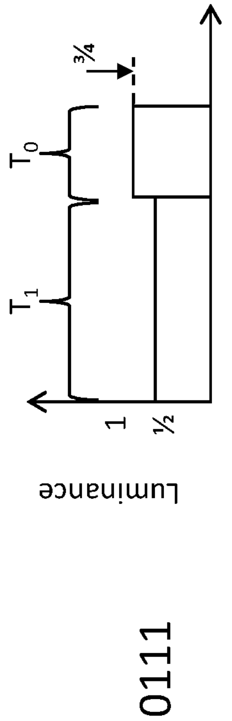
FIG. 13H2
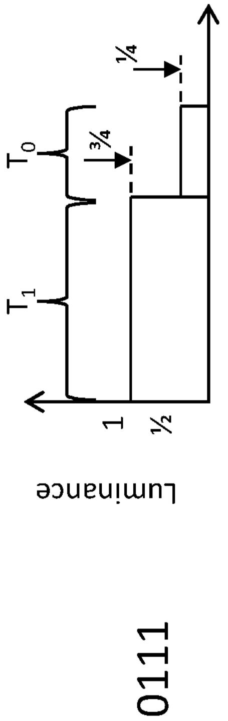
FIG. 13I
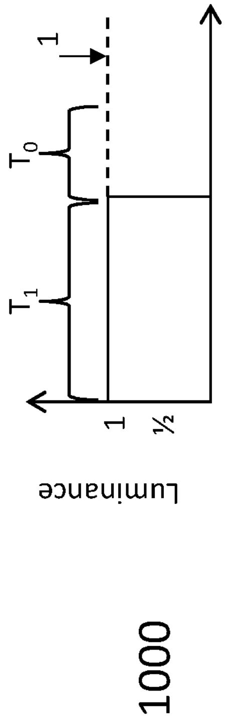

1001

1010

1011

1100

HYBRID PULSE-WIDTH-MODULATION PIXELS

TECHNICAL FIELD

The present disclosure relates to pixel control circuits for light-emitting displays that use temporally variable constant-current control.

BACKGROUND

Flat-panel displays are widely used to present images and information in graphic user interfaces controlled by computers. Such displays incorporate an array of light-controlling pixels. Each pixel emits or otherwise controls light. For example, liquid crystal displays control light emitted from a back light with a light-blocking liquid crystal at each pixel, organic light-emitting displays emit light from a stack of organic films, and inorganic light-emitting displays emit light from semiconductor crystals. In binary displays, each pixel controls light to be on at a desired brightness or off at a zero brightness. More commonly, pixels control light over a range of luminances, from zero to a maximum desired luminance. The luminance range can be referred to as a gray scale and is defined as a bit depth for a computer-controlled display, for example an eight-bit range (gray scale or bit depth) having 256 different luminance levels or a 12-bit range (gray scale or bit depth) having 4096 different luminance levels. In general, a greater luminance range is preferred to display images with more shades of light and dark in a color or color combination, such as white.

Depending on the pixel light-control technology, the luminance of a pixel can be controlled by driving a pixel over a range of voltages, over a range of currents, or at a constant power (e.g., at a given voltage and current) for a variable amount of time. Pixels that control light with variable time periods can use pulse-width modulation techniques that assign each bit of a multi-bit pixel value to a time period having a temporal length corresponding to the relative value of the bit in the multi-bit pixel. For example, in a four-bit pixel, the least-significant bit can have a temporal period equal to one minimum period and the most-significant bit can have a temporal period equal to eight minimum periods. However, the minimum period can have a value that is limited by the electronic circuits driving the pixels, thereby limiting the luminance range of pixels in a display at a given image frame rate.

There is a need, therefore, for pixel control circuits in displays using temporal modulation that provide improved gray-scale bit depth and image frame rates.

SUMMARY

According to some embodiments of the present disclosure, among other embodiments, a hybrid pulse-width-modulation pixel comprises a light controller that emits light in response to a variable power signal and a pixel controller operable to control the light controller. The pixel controller can be operable to receive a pixel luminance signal comprising multiple binary bits representing a desired light-controller luminance, generate the variable power signal in response to the pixel luminance signal, and drive the light controller with different amounts of power to emit light at different luminances in response to the variable power signal for different time periods. In some embodiments, the pixel controller is operable to provide the variable power signal at a constant first power for a first time period and provide the variable power signal at a constant second power different from the constant first power for a second time period. In some embodiments, the first period and the second period do not temporally overlap. As used herein, a constant power is constant over a specified time period. The amount of power provided to the light controller can be different in different time periods but is substantially constant during each time period (ignoring switching times or slew rates). In some time periods, the amount of power provided can be zero or substantially zero with no desired light output from the light controller.

In some embodiments, the pixel luminance signal specifies a pulse-width-modulation signal comprising pulse periods (pulses) of different temporal length, each temporal length corresponding to a relative value of at least some of the bits in the pixel luminance signal, for example relative values that are powers of two in a binary number system. In some embodiments, the pulse periods can be each a first time period during which power is provided at the constant first power. In some embodiments, a first pulse period of the pulse periods can be a first time period during which power is provided at the constant first power and a second pulse period of the pulse periods can be a second time period during which power is provided at the constant second power.

The pulse-width-modulation signal can have a minimum pulse width and the second time period can be substantially no less than or substantially equal to the minimum pulse width. The first time period can be longer than the second time period. By substantially is meant within design or manufacturing limitations. In some embodiments, the pixel controller is operable to provide the variable power signal at the constant second power for a third time period. The third time period can have the same length as or a length different from the second time period. In some embodiments, the pixel controller is operable to provide the variable power signal at a constant third power different from the first or second powers for a second time period.

In some embodiments, all of the multiple bits in the pixel luminance signal are bits in a pulse-width-modulation signal (referred to as temporal bits, each of which can be controlled at one or more powers). In some embodiments, some but not all of the multiple bits of the pixel luminance signal are bits in a pulse-width-modulation signal (the temporal bits) and the bits in the multiple bits of the pixel luminance signal that are not bits in the pulse-width-modulation signal (remaining bits) are power bits. A pixel luminance signal can comprise one power bit, two power bits, or more than two power bits. In general, power provided corresponding to bits that are not power bits can be provided at the first power and power provided corresponding to a power bit can be provided at the second power. If multiple power bits are specified, each relative value of the power bits can, but does not necessarily, correspond to a different relative second power.

According to embodiments of the present disclosure, the pixel controller can be operable to provide the variable power signal at a constant first power for a first time period (e.g., a pulse period) having a temporal duration corresponding to a relative value of one of the temporal bits and can be operable to provide the variable power signal at a constant second power corresponding to a value of the power bit(s) for a second time period. The constant second power can be different from the constant first power and the second time period can be substantially equal to or no less than the time period corresponding to a value of one of the temporal bits, e.g., the least-significant bit of the temporal bits in the pulse-width-modulation signal, for example within design and manufacturing tolerances. Thus, according to embodiments of the present disclosure, the pixel controller drives the light controller at the constant first non-zero power during pulse periods of the pulse-width modulation (temporal) signal in which the pulse-width-modulation signal corresponding to the pulse period is on (e.g., a one) and at a zero power when the pulse-width-modulation signal corresponding to the pulse period is off (e.g., a zero). During the second time period, the pixel controller drives the light controller at the constant second non-zero power when the power bit(s) are non-zero and at a zero power when the power bit(s) are zero.

According to embodiments of the present disclosure, the one or more power bits are one power bit and the constant second power drives the light controller to emit light at a luminance substantially one half of the luminance at which the constant first power drives the light controller. In some embodiments, the one or more power bits are two power bits and the pixel controller is operable to provide the variable power signal with four different amounts of power that drive the light controller to emit light at four different corresponding luminances, e.g., zero, one quarter, one half, and three quarters (or one) relative to the luminance of the constant first power. In some embodiments, the one or more power bits are three power bits and the pixel controller is operable to provide the variable power signal with eight different amounts of power that drive the light controller to emit light at eight different corresponding luminances, e.g., zero, one eighth, one quarter, three eighths, one half, five eighths, three quarters, and seven eighths (or one) relative to the luminance of the constant first power. In some embodiments, the one or more power bits are four power bits and the pixel controller is operable to provide the variable power signal with sixteen different amounts of power that drive the light controller to emit light at eight different corresponding luminances, e.g., zero, one sixteenth, one eighth, three sixteenths, one quarter, five sixteenths, three eighths, seven sixteenths, one half, nine sixteenths, five eighths, eleven sixteenths, three quarters, thirteen sixteenths, seven eighths, and fifteen sixteenths (or one) relative to the luminance of the constant first power. In general, the one or more power bits can be P power bits and the pixel controller is operable to provide the variable power signal with $2^P$ different amounts of power that drive the light controller to emit light at $2^P$ different corresponding luminances. The $2^P$ different corresponding luminances can each correspond to a binary weighted value of the power bits. In some embodiments, the one or more power bits are the least-significant bits in the multiple bits of the pixel luminance signal.

The light controller can be a liquid crystal, an organic light-emitting diode, or an inorganic light-emitting diode. In some embodiments, the light controller is an inorganic micro-light-emitting diode, e.g., having a length or width no greater than one hundred microns, no greater than fifty microns, no greater than twenty microns, no greater than fifteen microns, no greater than ten microns, no greater than five microns, or no greater than three microns.

In some embodiments, the light controller is driven to emit light more efficiently at the constant first power than at the constant second power and the second period is shorter than at least some of the first periods. By providing the power bits at a second power that is less efficient than the first power for a second period with a shorter temporal duration corresponding to the least-significant bit of the temporal bits, rather than for a first period that has a longer temporal duration, any loss of light-controller efficiency is reduced.

The variable power signal can be a current signal, a voltage signal, or a combination of a current signal and a voltage signal. An inorganic micro-light-emitting diode can be controlled to emit light most efficiently at a predetermined current density that can be the constant first power.

The pixel controller can be operable to provide the variable power signal at the constant second power for the second time period after providing the variable power signal at the constant first power for the first time period. The pixel controller can be operable to provide the variable power signal at the constant first power for the first time period after providing the variable power signal at the constant second power for the second time period. In some embodiments, the second time period has a first temporal portion and a second temporal portion, and the pixel controller is operable to provide the variable power signal at the constant second power for the second time period between providing the variable power signal at the constant first power for the first temporal portion and providing the variable power signal at the constant first power for the second temporal portion.

Some embodiments comprise a constant-current circuit operable to supply two, four, eight, sixteen, or more different constant currents at a desired voltage for example depending on a binary-weighted input value, e.g., corresponding to the power bits.

According to some embodiments of the present disclosure, a hybrid pulse-width-modulation-pixel display comprises an array of hybrid pulse-width-modulation pixels.

According to some embodiments of the present disclosure, methods of operating a hybrid pulse-width-modulation pixel with the pixel controller comprise receiving the pixel luminance signal, generating the variable power signal in response to the pixel luminance signal, and driving the light controller to emit light with the variable power signal for variable time periods by providing the variable power signal at a constant first power for a first time period, and providing the variable power signal at a constant second power for a second time period, wherein the constant second power is different from the constant first power. The second time period can be substantially equal to or no less than the time period corresponding to the value of the least significant of the temporal bits. The variable power signal can be provided at the constant second power for the second time period temporally before, after, or between providing the variable power signal at the constant first power for the first time period. The first time period can be a pulse period of a pulse-width-modulation signal having a temporal duration corresponding to a relative value of one of the temporal bits. Some methods comprise the pixel controller driving the light controller with the variable power signal using pulse-width modulation comprising first and second pulse periods having different temporal durations and driving the light controller at the constant first power for the first pulse period and driving the light controller at the constant second power for the second pulse period.

Some embodiments comprise switching a constant current supply from a first constant current to a second constant current after the first period and before the second period. Some embodiments comprise switching a constant current supply from a second constant current to a first constant current after the second period and before the first period.

Certain embodiments of the present disclosure provide a control circuit for pixels in a display that provide improved gray-scale resolution with relatively little or without any significant loss of light-controller efficiency. Control circuits disclosed herein are suitable for inorganic micro-light-emitting diodes and can be applied in an array of pixels in a display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIGS. 7A-7H2 show relative luminance output over time for each value of a three-bit pixel luminance signal having two temporal bits and one power bit according to illustrative embodiments of the present disclosure;

FIGS. 11A-11G show relative luminance output over time for each value of a three-bit pixel luminance signal having one additional power level according to illustrative embodiments of the present disclosure;

FIGS. 13A-13M show relative luminance output over time for each value of a four-bit pixel luminance signal having three additional power levels according to illustrative embodiments of the present disclosure;

Figure 1:
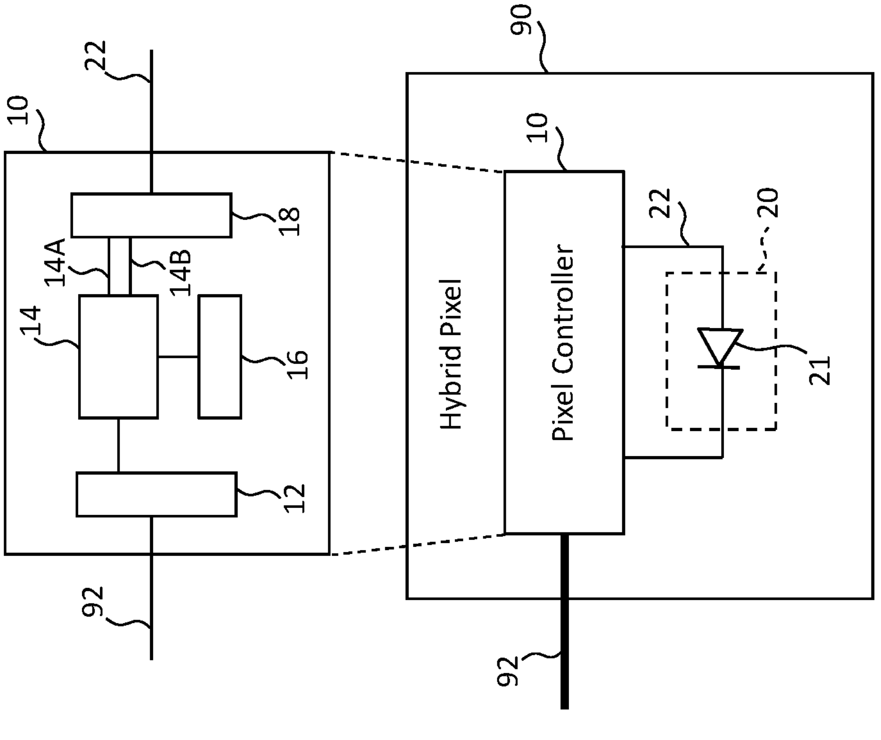
FIG. 1 is a schematic of a hybrid pixel comprising a light controller and a pixel controller with a detail of the pixel controller according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF CERTAIN EMBODIMENTS

Certain embodiments of the present disclosure provide a pixel with greater gray-scale resolution at a given image frame rate or a faster image frame rate for a given gray-scale resolution useful in a display. Pixel circuits can have a limited response frequency, for example a minimum switching period or maximum switching frequency that defines the shortest controllable temporal pulse received or provided by the pixel circuits. This minimum temporal period limits the minimum amount of time that a light controller controlled by the pixel circuit can controllably emit light. This limitation also specifies the maximum frame rate in a display comprising an array of pixels. Furthermore, for pixels controlled by pulse-width modulation (PWM) signals, the smallest PWM period is likewise limited by the shortest controllable temporal pulse and therefore limits the number of different signal values possible in a given period of time (e.g., a PWM signal in an image frame time) and therefore the gray-scale resolution of the pixel. Thus, there is an inherent limit to the image frame rate and gray-scale resolution that can be supported by a pixel circuit.

The minimum temporal control period in a pixel circuit might be limited, for example, by the slew rate of an electronic input or output signal, control signal, or driving transistor, by the parasitic resistance, capacitance, or inductance of control signal wires or driving wires, by the pixel circuit's ability to drive a desired amount of current at a given voltage, or by the pixel circuit's ability to drive a desired voltage at a given current. For example, if a minimum temporal control period is five hundred nanoseconds and an eight-bit PWM signal is used to control a pixel, the maximum frame rate for a pixel is 256*0.0000005=0.000128 seconds or almost 8000 frames per second. If a twelve-bit signal PWM signal is used with a minimum temporal control period of fifty microseconds, the maximum frame rate for a pixel is almost five image frames per second. Contemporary displays can operate at frame rates of up to 480 frames per second (or more) with gray-scale resolutions of twelve bits (4096 levels) or more. In some displays, even greater gray-scale resolutions can be desired, for example sixteen or twenty bits.

The electronic circuits available in some displays can have relatively large and slow transistors (e.g., in thin-film transistor circuits coated on a display substrate). More complex circuits and faster-switching materials can operate at higher frequencies and provide more power at higher voltages but can be more expensive or unavailable for a given display. There is, therefore, a need for pixel circuits, in particular digital pixel control circuits, that can provide improvements in frame rate and gray-scale resolution without requiring expensive and complex control circuits.

According to embodiments of the present disclosure and as illustrated in FIG. 1, a hybrid pulse-width-modulation pixel 90 comprises a pixel controller 10 and a light controller 20 that emits light in response to a variable power signal 22 specifying different powers that drives light controller 20 to emit light. The different powers can be different electrical powers, for example electrical power levels such as different electrical currents provided at different voltages. In some embodiments, the different powers are different electrical currents provided at a common voltage.

Pixel controller 10 can be operable to receive a pixel luminance signal 92 comprising multiple bits representing a desired light-controller luminance, generate variable power signal 22 in response to pixel luminance signal 92, and drive light controller 20 to emit light at different luminances with different amounts of power in response to variable power signal 22 for different time periods, e.g., at a first power for a first time period and at a second power different from the first power for a second time period. The first time period can, but does not necessarily, have a temporal duration different from the temporal duration of the second time period. In embodiments of the present disclosure, variable power signal 22 is an optical signal, a current signal, a voltage signal, or a combination of a current signal and a voltage signal (e.g., an electrical power signal). (To simplify the discussion, a luminance (or relative luminance) is often referred to as a power or relative power that is necessary to achieve the luminance, but it will be understood that the actual power is that which is necessary to achieve the desired luminance. For example, a power or luminance might be referred to as one half of a desired level, but it will be understood that the actual power is the power necessary to achieve a relative luminance of one half.)

FIG. 1 also illustrates a detail of pixel controller 10. (In the Figures, for clarity signals are not distinguished from wires or light pipes on which the signals can be transmitted.) Pixel luminance signal 92 can be received by an input circuit 12 that forwards the signal to a control circuit 14. Control circuit 14 can decode pixel luminance signal 92 and provide timing signals 14A and control power signals 14B to a drive circuit 18. Control circuit 14 can use a memory 16 to which control circuit 14 is connected. Drive circuit 18 produces variable power signal 22 and provides it to light controller 20. Light controller 20 can be an inorganic light-emitting diode 21. Other suitable light-controlling (e.g., light-emitting) elements of light controller 20 are known in the art. For simplicity and clarity, light controller 20 is referred to herein as "emitting" light whether light controller 20 emits light itself, such as with an organic or inorganic light-emitting diode, or selectively controls light propagation that originates elsewhere (e.g., using selective reflectance or filtering), such as in a liquid crystal display.

Figure 16:
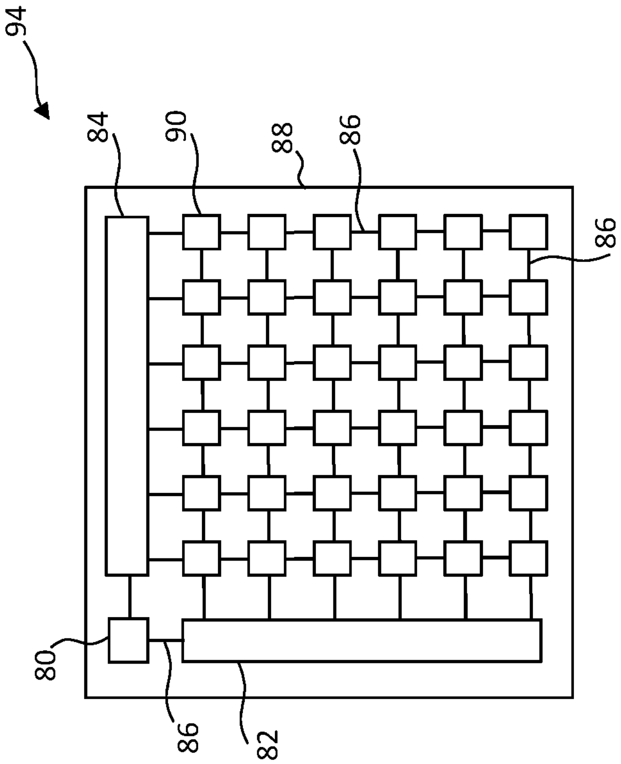
FIG. 16 is a schematic of a hybrid pulse-width-modulation-pixel display according to illustrative embodiments of the present disclosure.

Input circuit 12, control circuit 14, memory 16, and drive circuit 18 (e.g., pixel controller 10) can all be digital or mixed-signal circuits provided in one or more integrated circuits (e.g., silicon integrated circuits) and disposed on a display substrate 88 (e.g., as shown in FIG. 16, discussed below) or on a pixel substrate disposed on a display substrate 88. Pixel controller 10 can be native to a display substrate 88, native to a pixel substrate, or provided in integrated circuits disposed on and non-native to display substrate 88 or a pixel substrate, for example by micro-transfer printing. Light controller can likewise be disposed on a display substrate 88 or on a pixel substrate and can be non-native to either or both. Such integrated circuits can be provided in bare, unpackaged die and micro-transfer printed from source wafers to a desired target substrate (e.g., a display substrate 88 or pixel module substrate) and therefore can comprise broken (e.g., fractured) or separated tethers. Similarly, light controllers 20, such as inorganic light emitting diodes 21, can be transferred from LED source wafers to a desired target substrate (e.g., a display substrate 88 or pixel module substrate). Light controllers 20 can also comprise broken (e.g., fractured) or separated tethers. Bare-die integrated circuits disposed on a display substrate 88 (e.g., as shown in the hybrid pulse-width-modulation-pixel display 94 of FIG. 11) or on a pixel module substrate can be electrically connected using photolithographic or printed-circuit board methods and materials. Signals transmitted between integrated circuits or within an integrated circuit and to light controller 20 can be electrically conductive patterned thin-film metal electrical interconnects or wires 86 (e.g., metal wires 86) or light pipes, for example photolithographically defined on a display substrate 88, pixel substrate, or in integrated circuits. Power and ground signals can be provided on wires 86 to pixel controller 10 or light controller 20 (not shown in the Figures) to operate pixel controller 10 and light controller 20.

Variable power signal 22 can specify pulses of desired current at a desired voltage (e.g., with a desired electrical power) to cause light controller 20 to emit light at a desired luminance for a desired temporal period of time. In the first time period, the power can correspond to a desired light controller 20 luminance corresponding to a constant first power. In the second time period, the power can correspond to a desired light controller luminance corresponding to a constant second power. The power provided during the second time period can be less than the power provided during the first time period. The second time period can be the minimum controllable or designed pulse width or temporal period (temporal duration) for pixel controller 10, that is the minimum time that pixel controller 10 can controllably provide power to light controller 20 or a minimum time selected and designed for a pulse-width-modulation pixel circuit, for example a temporal period corresponding to a time specified by the least-significant bit in a pulse-width-modulation control method. Thus, variable power signal 22 can specify or include a pulse-width-modulation signal having one or more pulse periods. The pulse-width-modulation signal can include all of the multiple bits of pixel luminance signal 92 or only some, but not all, of the multiple bits. The power provided in each temporal period (pulse period) can be substantially constant (e.g., having a constant current at a constant voltage) over the temporal period, for example within design and manufacturing tolerances.

Figure 2:
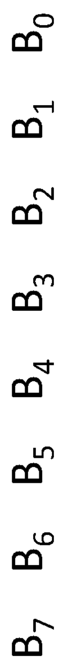
FIG. 2 represents bits in a pixel luminance signal according to illustrative embodiments of the present disclosure.

As shown in FIG. 2, pixel luminance signal 92 can comprise multiple bits B where the subscript x, as in $B_x$, represents a specific bit of multiple bits B. The multiple bits can comprise or be a digital, binary value where the subscript x represents the place or power of two of the bit in the digital binary value. The multiple bits can represent a desired luminance output for light controller 20 for a desired period of time such as an image frame time in a display.

In some embodiments of the present disclosure and as illustrated in FIGS. 3-9D, the multiple bits of pixel luminance signal 92 includes (i) temporal bits T specifying a pulse-width-modulation signal having different first time periods during which light controller 20 is driven at either zero power or at the constant first power and (ii) one or more power bits representing one or more power values corresponding to a second time period during which light controller 20 is driven at zero power or at a constant second power different from the constant first power. In some embodiments of the present disclosure and as illustrated in FIGS. 10A-13M, the multiple bits of pixel luminance signal 92 specify a pulse-width-modulation signal wherein each bit corresponds to a period of time having a different temporal duration from any other of the multiple bits. During at least one of the periods of time (e.g., a first time period) light controller 20 is driven at zero power or at a constant first power and during another different one of the periods of time light controller 20 is driven at zero power or at a constant second power different from the constant first power. (As used herein, zero power means substantially zero power within design and manufacturing limitations and, in some embodiments, is not exactly zero. Similarly, constant first and second powers are substantially constant for a time period at the desired power within design and manufacturing limitations and, in some embodiments, is not exactly constant or exactly at the desired first or second power and can exclude switching time.)

As shown in FIGS. 3-6E and with reference to the examples of FIGS. 7A-9D corresponding to some embodiments, some of multiple bits B in pixel luminance signal 92 (shown as $B_x$ where x is the bit place in a binary number comprising the multiple bits) are temporal bits T (shown as $T_y$ where y is the bit place in a binary number comprising the temporal bits) and a remainder of the multiple bits B are one or more power bits (shown as $P_x$ where x is the bit place in a binary number comprising the power bits). Temporal bits T can represent a pulse-width-modulation signal separate from power bits P. Pixel controller 10 is operable to provide variable power signal 22 at a constant first power for a first time period corresponding to a pulse period specified by a value of a temporal bit T (e.g., a PWM period) and provide variable power signal 22 at a constant second power corresponding to a value of the power bits P for a second time period separate from time periods specified by temporal bits T. The constant second power can be different from the constant first power and the second time period can be substantially equal to or less than the time period corresponding to the value of temporal bits T or substantially equal to the time period corresponding to the least-significant bit of temporal bits T. The least-significant bit of temporal bits T can represent the shortest temporal period of a pulse-width-modulation signal or can be a minimum temporal control period in a pixel circuit.

Variable power signal 22 can be substantially constant, e.g., a substantially constant current or constant voltage signal, or both, over the first time period and over the second time period when variable power signal 22 is not zero within design and manufacturing limitations. For example, variable power signal 22 can be a binary signal (either off at a power level of zero or on at a desired constant power) during the first time period and can be either off (e.g., at zero and corresponding to a zero bit) or on (e.g., corresponding to a one bit) at a constant second power level different from the first power level for the second time period. By substantially equal to is meant within manufacturing tolerances as designed and without regard to signal switching times. The examples of FIGS. 7A-9D that follow specify the second time period as having an equal temporal duration as the time period corresponding to the least-significant bit of temporal bits T.

Hybrid pulse-width-modulation pixel 90 can be a pixel in an array of pixels in a display and can provide pulse-width-modulation control in response to temporal bits T and pulse-amplitude control in response to power bits P of bits B of pixel luminance signal 92. According to embodiments of the present disclosure, pixel luminance signal 92 comprises at least one power bit P but can have any number of power bits P less than the number of bits B in pixel luminance signal 92. Likewise, for such embodiments, pixel luminance signal 92 comprises at least one temporal bit T but can have any number of temporal bits T less than the number of bits B in pixel luminance signal 92. Thus, in embodiments of the present disclosure, every multiple-bit pixel luminance signal 92 comprises at least one (or at least two) temporal bits T and at least one power bit P. Temporal bit(s) T and power bit(s) P can be encoded in multiple-bit pixel luminance signal 92 in any desired arrangement. For simplicity, temporal bits T are encoded as a binary value with the most-significant bit (MSB) located at the left of a written representation of temporal bits T and the least-significant bit (LSB) located at the right of a written representation of temporal bits T and the bits ordered in magnitude from left to right. Similarly, power bits P are encoded as a binary value with the most-significant bit (MSB) located at the left of a written representation of power bits P and the least-significant bit (LSB) located at the right of a written representation of power bits P and the bits ordered in magnitude from left to right. Power bits P are not interlaced between temporal bits T in pixel luminance signal 92 (but could be) and are written as the least-significant bits of pixel luminance signal 92. However, this arrangement of bits as written or communicated to hybrid pulse-width-modulation pixel 90 is completely arbitrary; any desired bit arrangement can be used.

Figure 3A:
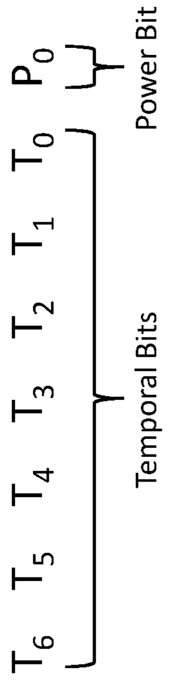
FIG. 3A represents temporal bits and a single power bit in a pixel luminance signal according to illustrative embodiments of the present disclosure.
Figure 3B:
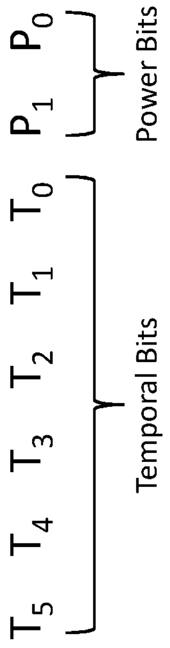
FIG. 3B represents temporal bits and two power bits in a pixel luminance signal according to illustrative embodiments of the present disclosure.
Figure 4:
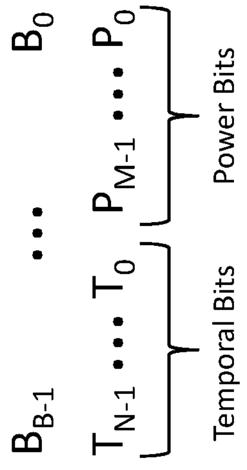
FIG. 4 generally represents temporal bits and power bits in a pixel luminance signal using ellipses according to illustrative embodiments of the present disclosure.

As shown in FIG. 2 and according to some embodiments, a pixel luminance signal 92 can comprise multiple bits B (e.g., bits $B_0$ to $B_7$, for an eight-bit pixel luminance signal 92). Pixel luminance signal 92 can comprise any number of bits B greater than or equal to two. FIGS. 3A and 3B show pixel luminance signal 92 of the embodiments divided into temporal bits T and power bits P. Power bits P can be, but are not necessarily, the least-significant bits of multiple bits B. FIG. 3A illustrates seven temporal bits $T_0$ to $T_6$ and a single power bit $P_0$ in eight-bit pixel luminance signal 92 of FIG. 2. FIG. 3B illustrates six temporal bits $T_0$ to $T_5$ and two power bits $P_0$ to $P_1$ in eight-bit pixel luminance signal 92 of FIG. 2. More generally and as shown in FIG. 4, pixel luminance signal 92 can have B bits (e.g., $B_{B-1}$ to $B_0$) divided into N temporal bits $T_{N-1}$ to $T_0$ and M power bits $P_{M-1}$ to $P_0$, where N+M=B. The illustrations of FIGS. 2, 3A, and 3B with eight bits are exemplary; the number of bits B can be any integer larger than one and N and M can be any non-zero value where N+M=B. In general, and for example, the number of bits B specifying a desired pixel luminance at given frame rate is limited by electronic or optical transmission rates on a display backplane, the number of bits N is limited by electronic or optical transmission rates on a display backplane or circuitry clock rates in hybrid pulse-width-modulation pixel 90, and the number of bits M is limited by the size and complexity of pixel control circuit 14 and drive circuits 18 in hybrid pulse-width-modulation pixel 90. The actual number of bits B, N, or M will be a consequence of, for example, design and hardware choice and limitations in a display comprising an array of hybrid pulse-width-modulation pixels 90.

Figure 5:
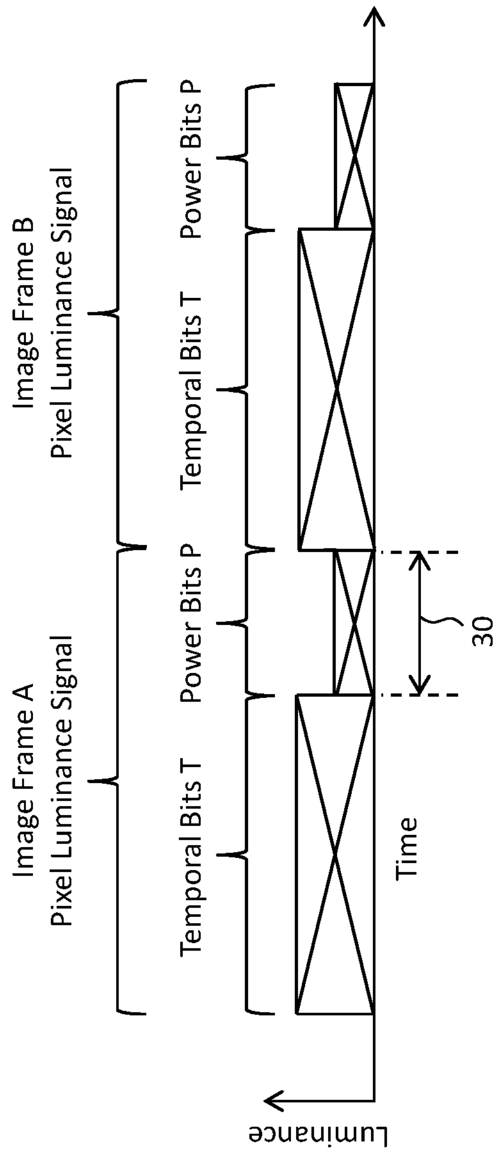
FIG. 5 is a general timing diagram for a pixel luminance signal comprising multiple image frames according to illustrative embodiments of the present disclosure.

As shown in FIG. 5 and according to embodiments of the present disclosure, images comprise pixels that are each displayed by a hybrid pulse-width-modulation pixel 90 in an array of hybrid pulse-width-modulation pixels 90, for example in a display. Images (image frames) and pixel values are sequentially provided in time so that each hybrid pulse-width-modulation pixel 90 receives a pixel for each image frame, displays the pixel, and then receives a subsequent pixel of a subsequent image frame for display. FIG. 5 illustrates a first image frame A temporally followed by second image frame B. Each image frame comprises pixels specifying a desired luminance for each hybrid pulse-width-modulation pixel 90. Pixel luminance signal 92 for each hybrid pulse-width-modulation pixel 90 in each image frame comprises B bits divided into temporal bits T and power bits P. In some embodiments, the number of temporal bits T and power bits P can be the same for each pixel in an image frame or can be different for different pixels within an image frame. In some embodiments, the number of temporal bits T and power bits P can be different between image frames. The temporal length (period) corresponding to power bits P can be a designed minimum pulse width 30 and can be separate from the number of power bits P. FIG. 5 illustrates temporal bits T at the constant first power and power bits P at the constant second power; the number of power bits requires $2^P$ constant second powers different from the constant first power.

Figure 6A:
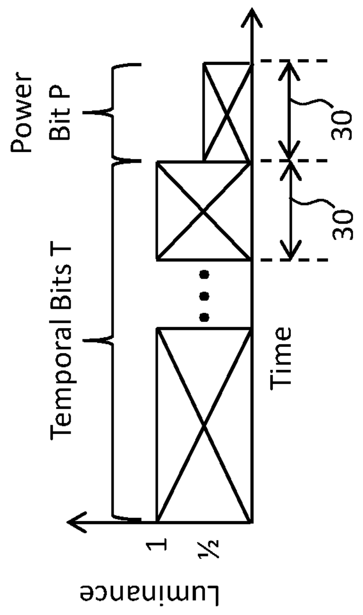
FIG. 6A is a timing diagram for a pixel luminance signal with temporal pulse periods and a single power pulse period temporally following the temporal pulse periods and corresponding to a single image frame according to illustrative embodiments of the present disclosure.

For example and as illustrated in FIG. 6A, the temporal length (minimum pulse width 30 time period) for M power bits P can be one minimum pulse width 30 time period for any or all of one, two, or three (or more) power bits P in contrast to the temporal length (periods) for temporal bits T equal to $2^N-1$ minimum pulse width 30 time periods (where N is the number of temporal bits T and temporal bits T represent a pulse-width-modulation signal). The number of minimum pulse width 30 time periods can correspond to a binary-weighted value of temporal bits T. The total time period corresponding to the image frame can therefore be $2^N$ equal to ($2^N-1$) minimum pulse width 30 time periods for temporal bits T plus one more minimum pulse width 30 time period for any number of power bits P. In FIG. 6A, each pulse period is indicated with a crossed rectangle. Temporal bits T are output with a desired luminance corresponding to the constant first power, indicated as a relative luminance value of 1 with a corresponding more-efficient current density for the LEDs, for a time equal to $2^N-1$ minimum pulse width 30 time periods. (The ellipses represent additional pulse periods not specified in FIG. 6A.) Power bits P are output with a desired luminance that is one half of the temporal luminance at a current density that is relatively less efficient for a single minimum pulse width 30 time period. The example of FIG. 3A having seven temporal bits will thus require 128 ($2^7$) minimum pulse width 30 time periods and the example of FIG. 3B having six temporal bits will thus require 64 ($2^6$) minimum pulse width 30 time periods.

Figure 6B:
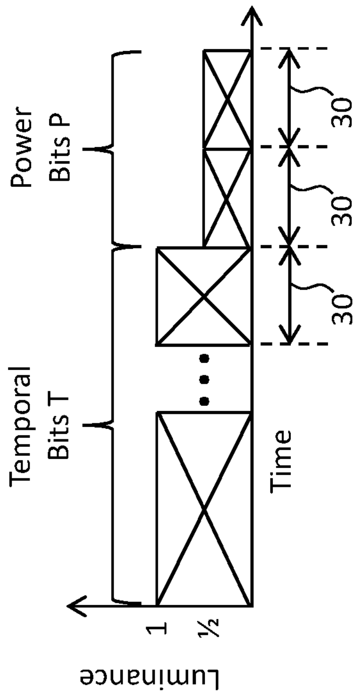
FIG. 6B is a timing diagram for a pixel luminance signal with temporal pulse periods and two power pulse periods temporally following the temporal pulse periods and corresponding to a single image frame according to illustrative embodiments of the present disclosure.
Figure 6C:
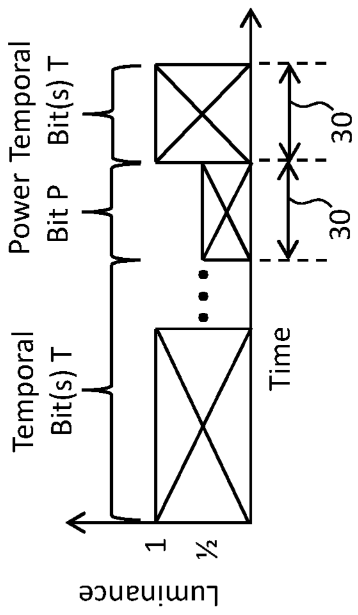
FIG. 6C is a timing diagram for a pixel luminance signal with one power pulse period temporally between the temporal pulse periods and corresponding to a single image frame according to illustrative embodiments of the present disclosure.
Figure 6D:
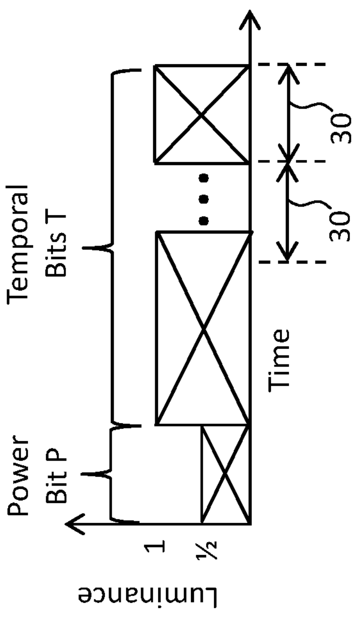
FIG. 6D is a timing diagram for a pixel luminance signal with one power pulse period temporally before the temporal pulse periods and corresponding to a single image frame according to illustrative embodiments of the present disclosure.
Figure 6E:
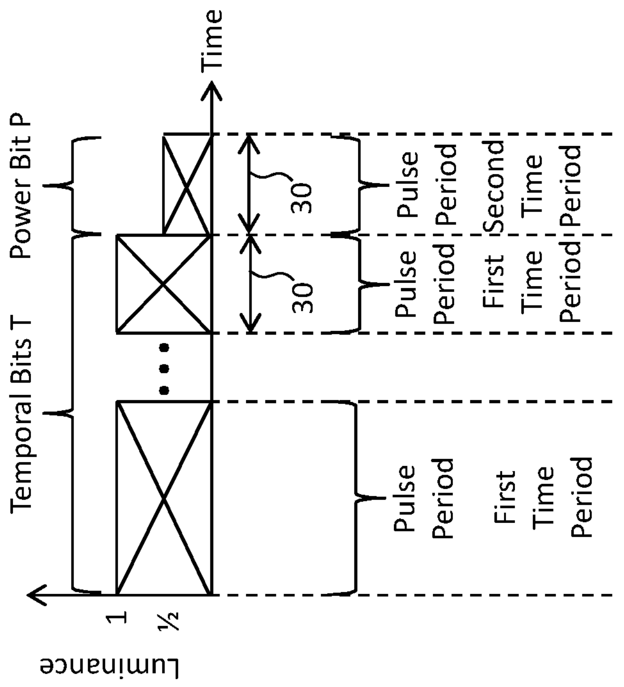
FIG. 6E is a timing diagram corresponding to FIG. 6A illustrating pulse periods according to illustrative embodiments of the present disclosure.

FIG. 6B illustrates embodiments in which power corresponding to power bits P are output in more than one minimum pulse width 30. In such embodiments, multiple power bits P can be output with fewer than $2^P$ power levels in addition to the constant first power but require one or more additional pulse periods. FIG. 6A illustrates power bit P encoded after temporal bits T and can represent the second time period temporally disposed after the first time period(s). FIG. 6C illustrates power bit P encoded within temporal bits T and can represent the second time period temporally disposed within or between pulse periods of the first time periods. FIG. 6D illustrates power bit P encoded before temporal bits T and can represent the second time period temporally disposed before the first time period(s). By disposing second time period after, between, or before pulse periods of the first time periods, flicker can be controlled, for example reduced. FIG. 6E, corresponding to FIG. 6A, graphically illustrates first and second time periods. First time periods can correspond to any one of the pulse periods of a pulse-width-modulation signal corresponding to temporal bits T at the constant first power (if not zero) and second time period temporally following first time period(s) corresponding to power bit(s) P at the constant second power (if not zero).

FIGS. 7A-7H illustrate a specific example of a three-bit pixel luminance signal 92 comprising two temporal bits T and one power bit P requiring $2^1$ equal to two constant second powers (including zero). A three-bit pixel luminance signal 92 can specify eight different luminance levels, zero through seven. The constant first power can have a relative value of one and constant second power can have a relative value of ½, but the relative values are arbitrary and can be, for example, a relative constant first power of two and a relative constant second power of one equivalent to scaling (multiplying) by two. The actual power (and corresponding luminance) associated with the values is controlled by control circuit 14 and drive circuit 18 in response to the pixel luminance signal 92 bits. The example Figures simply represent the relative luminance integrated over time specified by pixel luminance signal 92 for an image frame to provide a luminance level associated with pixel luminance signal 92. Thus, in this example, temporal bits T correspond to first time periods with constant first power of zero or one and power bit P corresponds to second time period with constant second power of zero or ½. Each of FIGS. 7A to 7H illustrate the luminance output over time corresponding to each of the eight ($2^3$) possible values of the three-bit pixel luminance signal 92 ranging from zero to seven.

Figure 7A:
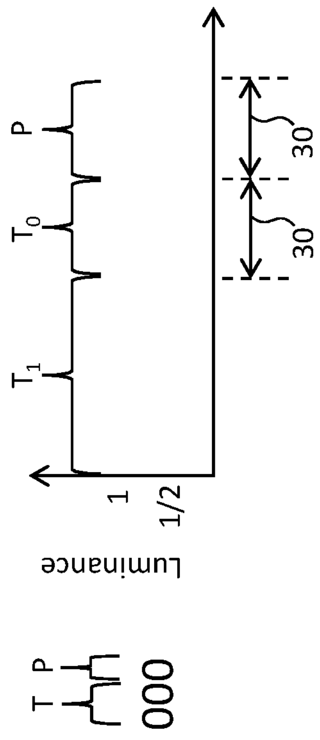
Figure 7B:
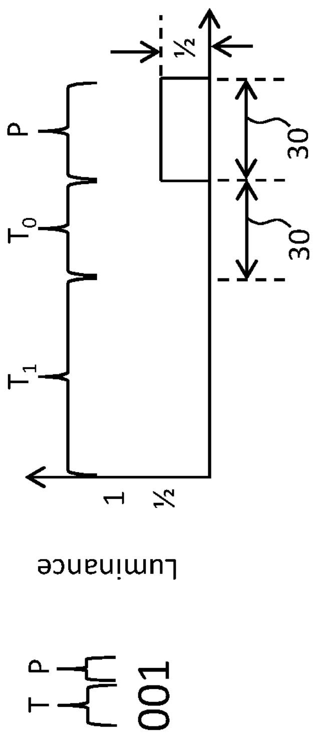
Figure 7C:
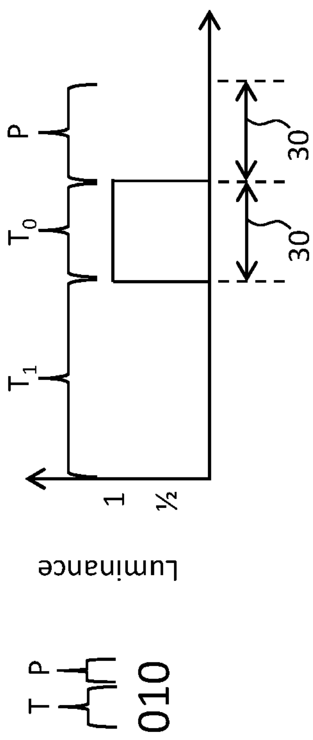
Figure 7D:
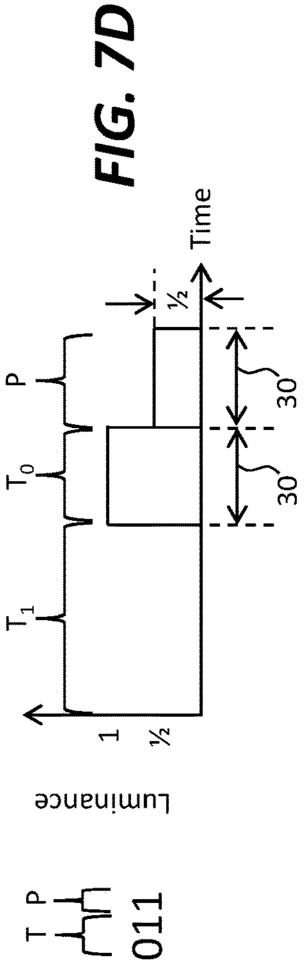
Figure 7E:
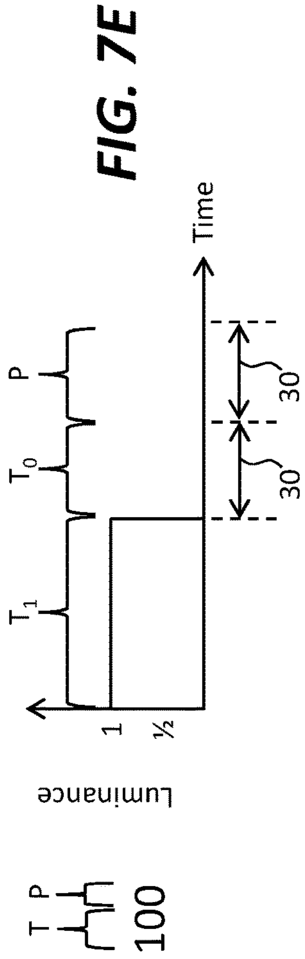
Figure 7F:
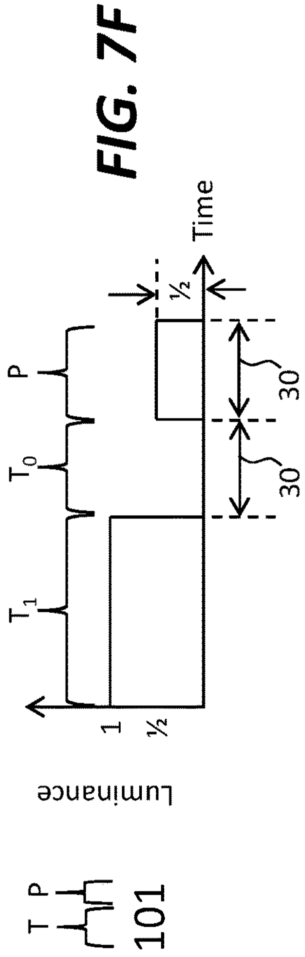

As shown in the timing and luminance diagram of FIG. 7A for a pixel luminance signal 92 of zero, the luminance output for light controller 20 is zero. As shown in FIG. 7B for a pixel luminance signal 92 of one, the luminance output for light controller 20 is at a constant first power of zero for the first time periods corresponding to temporal bits T and at a constant second power of ½ for the second time period corresponding to power bit P. As shown in FIG. 7C for a pixel luminance signal 92 of two, the luminance output for light controller 20 is at a constant first power of one for a first time period corresponding to temporal bit $T_0$ and at a constant second power of zero for the second time period corresponding to power bit P. As shown in FIG. 7D for a pixel luminance signal 92 of three, the luminance output for light controller 20 is at a constant first power of one for a first time period corresponding to temporal bit $T_0$ and at a constant second power of ½ for the second time period corresponding to power bit P. As shown in FIG. 7E for a pixel luminance signal 92 of four, the luminance output for light controller 20 is at a constant first power of one for a first time period corresponding to temporal bit $T_1$ (having a temporal period twice that of $T_0$), at a power of zero for a time period corresponding to temporal bit $T_0$, and at a constant second power of zero for the second time period corresponding to power bit P. As shown in FIG. 7F for a pixel luminance signal 92 of five, the luminance output for light controller 20 is at a constant first power of one for a first time period corresponding to temporal bit $T_1$ (having a temporal period twice that of $T_0$), at a power of zero for a time period corresponding to temporal bit $T_0$, and at a constant second power of ½ for the second time period corresponding to power bit P. As shown in FIG. 7G for a pixel luminance signal 92 of six, the luminance output for light controller 20 is at a constant first power of one for a first time period corresponding to temporal bit $T_1$ (having a temporal period twice that of), at a constant first power of one for a time period corresponding to temporal bit $T_0$, and at a constant second power of zero for the second time period corresponding to power bit P. As shown in FIG. 7H1 for a pixel luminance signal 92 of seven, the luminance output for light controller 20 is at a constant first power of one for a first time period corresponding to temporal bit $T_1$ (having a temporal period twice that of $T_0$), at a constant first power of one for a first time period corresponding to temporal bit $T_0$, and at a constant second power of ½ for the second time period corresponding to power bit P. Thus, the output in this example ranges from zero to 3½ that (scaled by two) corresponds to relative luminance output of zero to seven, as specified by pixel luminance value 92. However, the absolute luminance is slightly smaller than a conventional pulse-width modulation method. FIG. 7H2 shows the P value of pixel luminance signal 92 of $111_2$ mapped to a relative power level of one instead of ½, as in FIG. 7H1. This method provides slightly greater luminance (equivalent to that of a conventional PWM method) but has a different change in luminance with respect to changes in pixel luminance signal 92 values from a value of $110_2$ to $111_2$ than between the other pixel luminance signal 92 values.

As illustrated in FIGS. 7A-7H2, power bit P enables an additional half-luminance output for any value of temporal bits T, thus providing an extra bit of gray scale resolution, for example providing luminance values of (in base 10): 0, ½, 1, 1½, 2, 2½, 3, 3½, 4, 4½, 5, 5½, 6, 6½, 7, and 7½, or 16 values total, equivalent to a four-bit gray-scale resolution. Equivalently, the values can be scaled by two to provide the conventional representation of four-bit values $0_{10}$ to $15_{10}$ in base 10 or $0000_2$ to $1111_2$ in binary base two values. The luminance seen by an observer is the integral of the luminance signal over time (e.g., the total number of photons emitted over the image frame period) so long as the image frame period is short enough to avoid perceptible flicker to an observer.

Constant second power can drive light controller 20 less efficiently than constant first power. In the three-bit example of FIGS. 7A-7H1, hybrid pulse-width-modulation pixel 90 is operated with a less-efficient current for only one minimum pulse width 30 time period corresponding to the P bit and pulse for only the odd values of pixel luminance signal 92 and for only one quarter of each frame period. Thus, the loss in efficiency using the constant second power is quite small and, as the number of bits in pixel luminance signal 92, the loss in efficiency decreases.

Figure 8A:
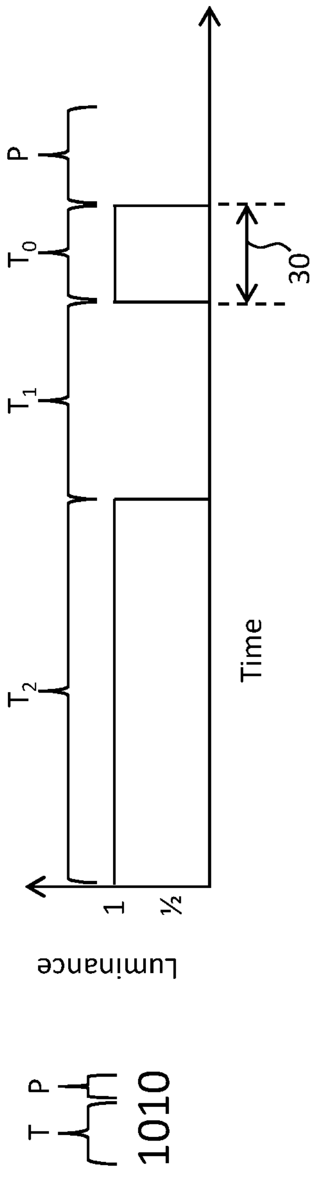
FIG. 8A shows relative luminance output over time for a four-bit pixel luminance signal equal to ten having three temporal bits and a single power bit and FIG. 8B shows luminance output over time for a four-bit pixel luminance signal equal to eleven having three temporal bits and a single power bit according to illustrative embodiments of the present disclosure.
Figure 8B:
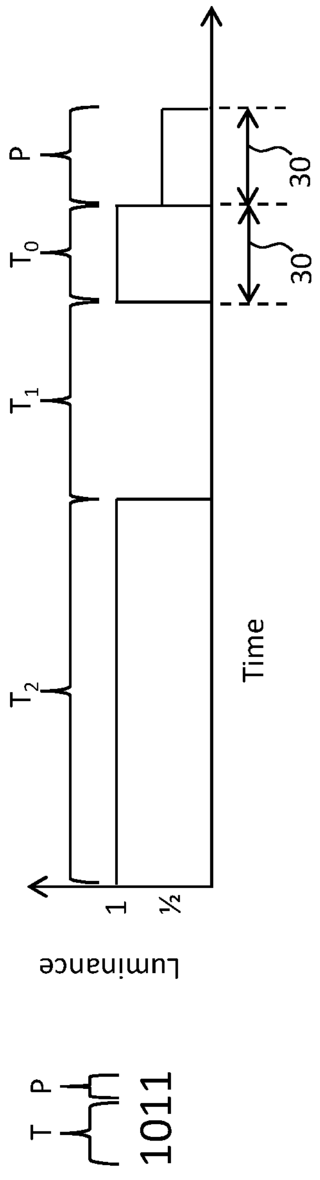

FIGS. 8A-8B illustrate embodiments with four-bit pixel luminance signals 92 having three temporal bits T and one power bit P. As shown in FIG. 8A for a value of ten ($10_{10}$ and $1010_2$) a first time period $T_2$ of temporal bits T having a relative duration of four least-significant bits corresponds to a variable power signal 22 providing a luminance of one, a first time period $T_1$ of temporal bits T having a relative duration of two least-significant bits corresponds to a variable power signal 22 providing a luminance of zero, a first time period $T_0$ of temporal bits T having a relative duration of one least-significant bit corresponds to a variable power signal 22 providing a luminance of one, and a second time period P corresponds to a variable power signal 22 providing a luminance of zero, for an integrated value over the frame period of five (when scaled by a factor of two corresponding to pixel luminance signal 92 of ten). As shown in FIG. 8B for a value of eleven, a first time period $T_2$ of temporal bits T having a relative duration of four least-significant bits corresponds to a variable power signal 22 providing a luminance of one, a first time period $T_1$ of temporal bits T having a relative duration of two least-significant bits corresponds to a variable power signal 22 providing a luminance of zero, a first time period $T_0$ of temporal bits T having a relative duration of one least-significant bit corresponds to a variable power signal 22 providing a luminance of one, and a second time period P corresponds to a variable power signal 22 providing a luminance of ½, for an integrated value over the frame period of five and one half (when scaled by a factor of two corresponding to pixel luminance signal 92 of eleven).

Figure 9A:
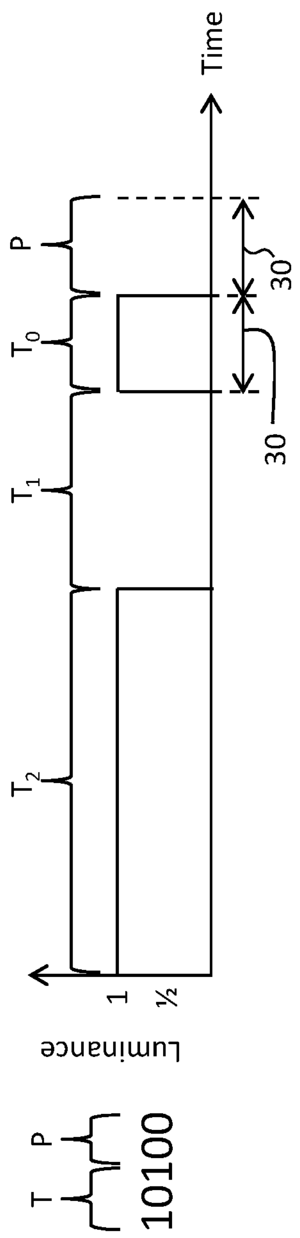
FIG. 9A shows luminance output over time for a five-bit pixel luminance signal equal to twenty having three temporal bits and two power bits.
Figure 9B:
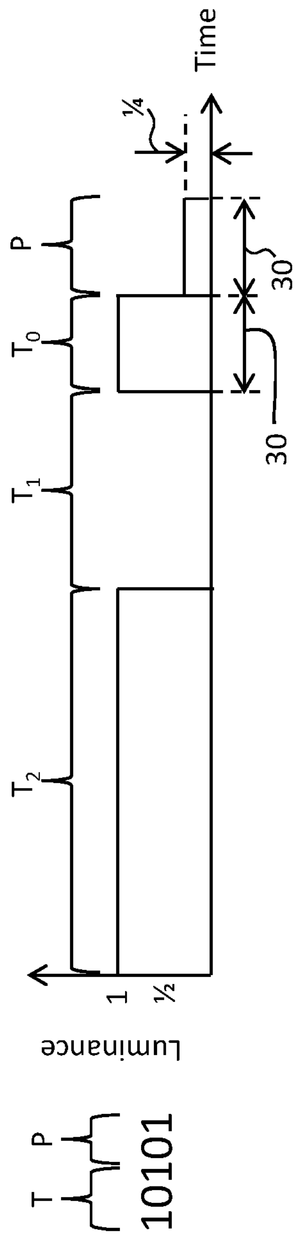
FIG. 9B shows luminance output over time for a five-bit pixel luminance signal equal to twenty-one having three temporal bits and two power bits.
Figure 9C:
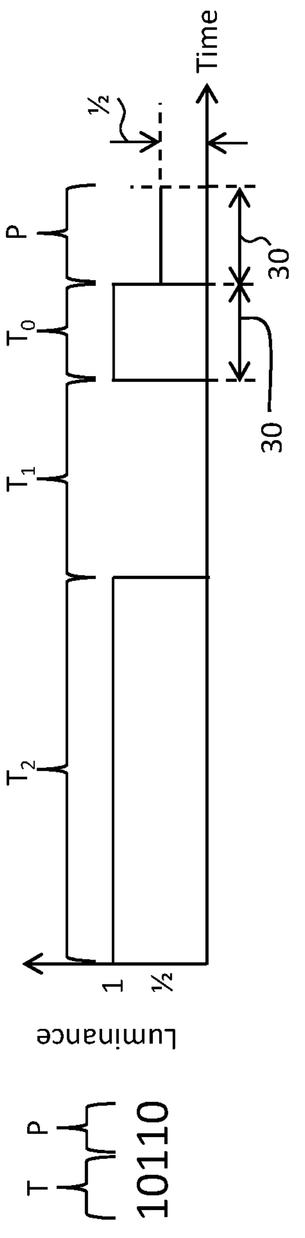
FIG. 9C shows luminance output over time for a five-bit pixel luminance signal equal to twenty-two having three temporal bits and two power bits.
Figure 9D:
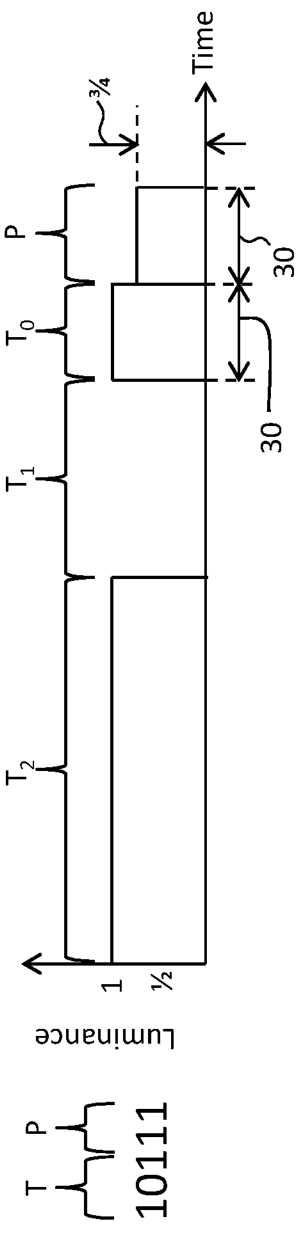
FIG. 9D shows luminance output over time for a five-bit pixel luminance signal equal to twenty-three having three temporal bits and two power bits according to illustrative embodiments of the present disclosure.

FIGS. 9A-9D illustrate embodiments with five-bit pixel luminance signals 92 having three temporal bits T and two power bits P. To provide a luminance corresponding to two power bits, $2^P$ equal to $2^2$ or four constant second powers different from the constant first power of one can be provided: zero, ¼, ½, and ¾. In this example, the value of the three temporal bits T is arbitrarily set to $5_{10}$ ($101_2$, any number from zero to seven could be used) and the two P bits P are set to zero, one, two, or three, corresponding to the pixel luminance values $20_{10}$ ($10100_2$), $21_{10}$ ($10101_2$), $22_{10}$ ($10110_2$), and $23_{10}$ ($10111_2$) in FIGS. 9A-9D, respectively. In the luminance and timing diagram of FIG. 9A, power bits P are set to zero and light output for the most-significant bit value of one for the temporal values T specifies constant first power at a relative luminance of one for four minimum pulse width 30 periods, the next bit at a bit value of zero for two minimum pulse width 30 periods has no power applied, and the least-significant bit outputs light for a bit value of one at a relative luminance of one for one minimum pulse width 30 period. No current is applied or light output for power bit P equal to zero. In FIG. 9B-9D, light corresponding to temporal bits T is output as for FIG. 9A, since the value of temporal bits T is the same. However, in FIG. 9B, power bits P are set to one ($01_2$), so that power is applied and light output for a single minimum pulse width 30 time period, but at a luminance one quarter of that of temporal bits T equal to one. In FIG. 9C, the power bits P are set to two ($10_2$), so that power is applied and light output for a single minimum pulse width 30 time period, but at a luminance one half of that of temporal bits T equal to one. In FIG. 9D, power bits P are set to three ($11_2$), so that power is applied and light output for a single minimum pulse width 30 time period, but at a luminance three quarters of that of temporal bits T equal to one.

In the embodiments of FIGS. 9A-9D, power bits P enable four luminance levels (including zero) for every value of temporal bits T, thus providing an extra two bits of gray-scale resolution in addition to the gray-scale resolution provided by temporal bits T, for example providing luminance values of (in base 10): 0, ¼, ½, ¾, 1, 1¼, 1½, 1¾, 2, 2¼, 2½, 2¾, 3, 3¼, 3½, 3¾, 4, 4¼, 4½, 4¾, 5, 5¼, 5½, 5¾, 6, 6¼, 6½, 6¾, 7, 7¼, 7½, 7¾, or 32 values total, equivalent to a five-bit gray-scale resolution. Equivalently, the values can be multiplied by four to provide the conventional representation of four-bit values from $0_{10}$ to $31_{10}$ in base 10 or $00000_2$ to $11111_2$ in binary base 2 values. Thus, the examples of FIGS. 9A-9D provide a five-bit gray scale in nearly the same image frame time as a three-bit gray scale using conventional pulse-width modulation.

In general, the number of power levels equals the number of possible values of power bits P, equal to $2^P$ (including zero and corresponding to $2^P$ different luminance levels). The number of luminance levels and power levels can correspond to a binary-weighted value of power bits P. FIGS. 7A-7H2 and 8A-8B illustrate pixel luminance signals 92 with one power bit P and two levels (0 and ½) and FIGS. 9A-9D illustrate pixel luminance signals 92 with two power bits P and four levels (0, ¼, ½, and ¾). In some embodiments of the present disclosure, pixel luminance signals 92 can comprise three power bits P and hybrid pulse-width-modulation pixel 90 is operable to provide variable power signal 22 with eight different amounts of power (e.g., using electrical current or voltage) that drive light controller 20 to emit light at eight different corresponding luminances.

In some embodiments, a power equal to one is at least somewhat more efficient than powers equal to one quarter, one half, or three quarters. However, the less efficient output corresponding to power bits P only occurs for one minimum pulse width 30 and is therefore a relatively small portion of the total output so that power bits P do not substantially deleteriously affect the efficiency of light controller 20. There would also be a corresponding slightly greater image frame period but, again, the relatively longer frame period is relatively small, for example 1 part in $2^B$. Thus, for an eight-bit pixel luminance signal 92 with 256 luminance levels, the increase in frame period is only about 0.4%. For a twelve-bit pixel luminance signal 92 with 4096 luminance levels, the increase in frame period is only about 0.024%. As illustrated for example in FIG. 7H1, the maximum brightness is also reduced since power bits P for the largest pixel luminance signal 92 do not correspond to a relative power of one but, as shown in FIG. 7H2, can be mapped to the maximum pixel luminance value 92 with a reduction in the uniformity of pixel luminance changes for that value (e.g., the slope of a function relating luminance to pixel luminance signal 92 value changes).

Embodiments of the present disclosure provide additional bit depths for pixel luminance signals 92. A conventional embodiment of a three-bit pulse-width-modulation signal requires seven least-significant bit periods 30 for each image frame. In contrast, with one power bit, as shown in FIGS. 7A-7H2, each image frame requires four least-significant bit periods 30. Similarly, a conventional embodiment of a four-bit pulse-width-modulation signal requires fifteen least-significant bit periods 30 for each image frame. In contrast, with one power bit, as shown in FIGS. 8A-8B, each image frame requires eight least-significant bit periods 30. A conventional embodiment of a five-bit pulse-width-modulation signal requires thirty-one least-significant bit periods 30 for each image frame. In contrast, with two power bits, as shown in FIGS. 9A-9D, each image frame requires eight least-significant bit periods 30. In general, a conventional pulse-width modulation scheme requires B pulse periods having a total duration equal to $2^B-1$ least-significant bit pulse periods where B is the number of bits in pixel luminance signal 92. In contrast, embodiments of the present disclosure require $2^T$ least-significant bit periods where B=T+P and P is the number of power bits requiring $2^P$ powers rather than the two powers (off and on or zero and one) required by a conventional pulse-width modulation method. Thus, embodiments of the present disclosure provide reduced frame periods for an equivalent bit depth. Alternatively, for a constant frame time (ignoring the additional pulse period for the additional power least-significant bit), embodiments of the present disclosure provide a bit depth with P additional bits.

Figure 10A:
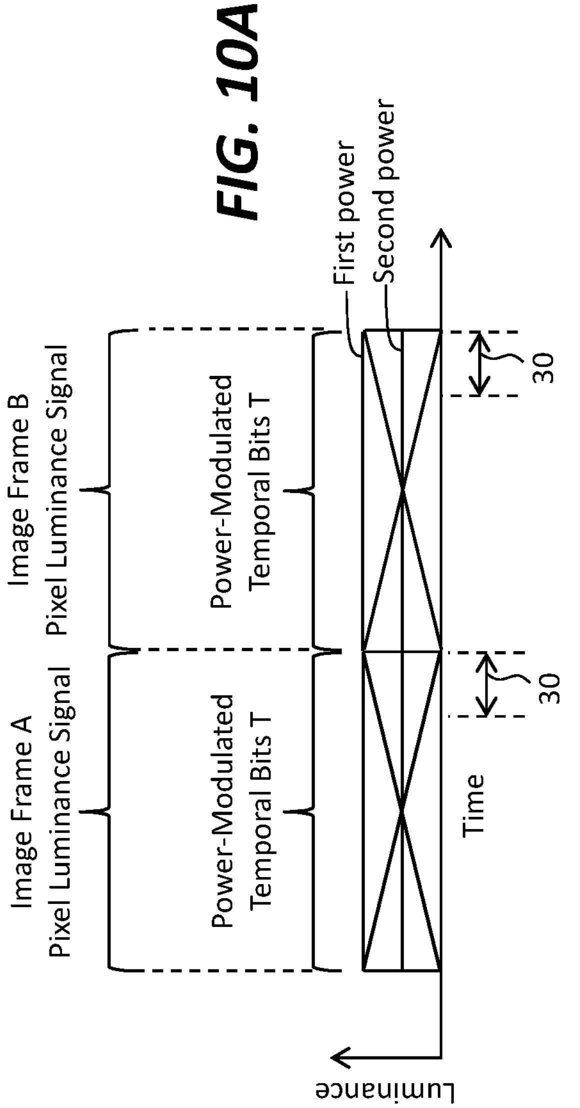
FIG. 10A is a timing diagram for a pixel luminance signal comprising multiple image frames according to illustrative embodiments of the present disclosure.
Figure 10B:
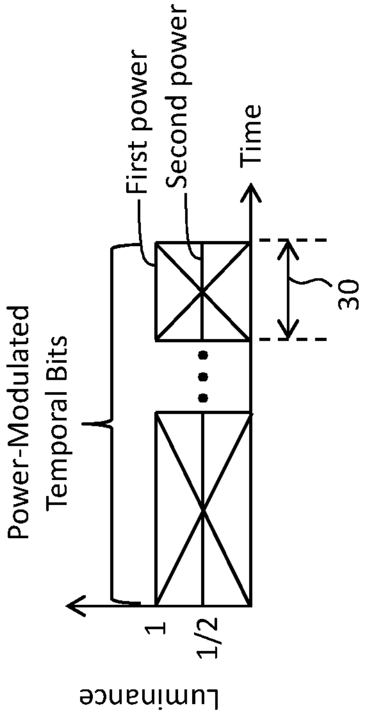
FIG. 10B is a timing diagram for a pixel luminance signal for a single image frame according to illustrative embodiments of the present disclosure.
Figure 10C:
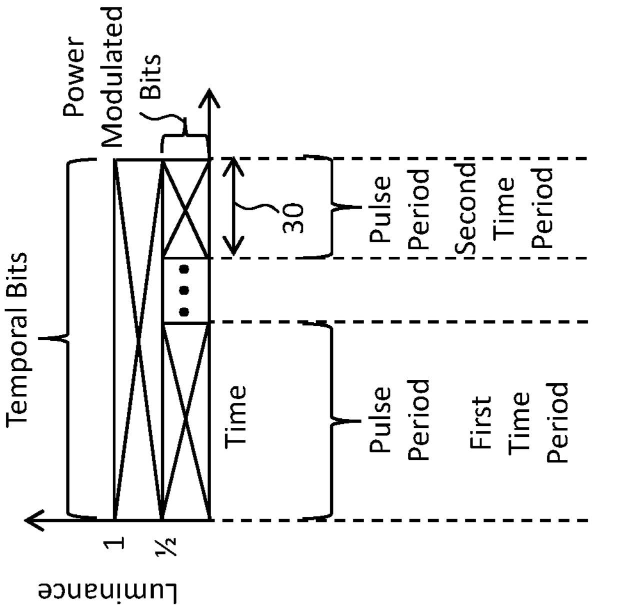
FIG. 10C is a timing diagram corresponding to FIG. 10B illustrating pulse periods according to illustrative embodiments of the present disclosure.

The embodiment examples of FIGS. 3A-9D add an additional pulse period for power bit P to a pulse-width-modulation signal for temporal bits T, slightly increasing the frame period. In some embodiments, instead of adding an additional pulse period modulated with different powers, each pulse-width modulation pulse period can be modulated with different powers so that each pulse period can vary in time and in power. As shown in FIG. 10A, different pulse periods (e.g., first and second time periods) associated with temporal bits T can be driven at different powers, e.g., constant first and second powers. FIG. 10B illustrates a single image frame of temporal bits T specifying a variable power signal 22 with constant first and second powers. The crossed-through rectangles corresponding to pulse periods in FIGS. 10A-10C are shown with a horizontal line at the top to indicate a constant first power and in the center of the rectangles to indicate a constant second power as shown more explicitly in FIG. 10C. Depending on the value of pixel luminance signal 92, either the constant first power, the constant second power, or a zero power is used for each pulse period. FIGS. 10A-10C illustrate a power of ½ in addition to one and zero, but in some embodiments more powers can be used for each or any of the pulse periods, for example, two, three, four, seven, or fifteen different relative powers in addition to a relative one or zero power that causes light controller 20 to emit light at a corresponding relative luminance.

FIGS. 11A-11G illustrate an example of a three-bit pixel luminance signal 92. In a conventional pulse-width modulation method, the three bits can correspond to three pulse periods having relative lengths of four, two, and one, all driven at a relative zero or one power. In contrast and according to embodiments of the present disclosure, each of the three pulse periods can be driven at three or more powers, reducing the number of pulse periods necessary to emit light of the corresponding luminance or increasing the bit depth. The examples of FIGS. 11A-11G use three relative powers, zero, one half, and one and provide a three-bit gray scale in the same frame period that a two-bit conventional pulse-width modulation method requires.

Figure 11F:
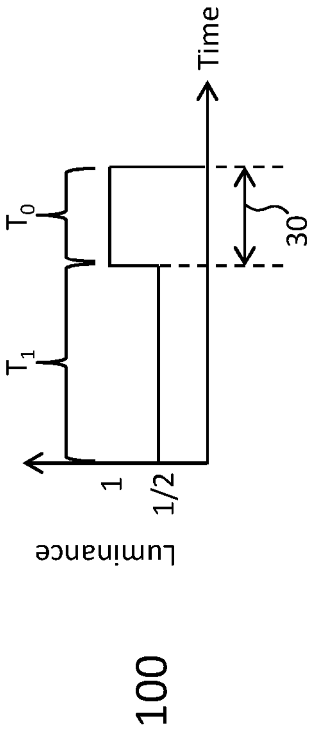
Figure 11F:
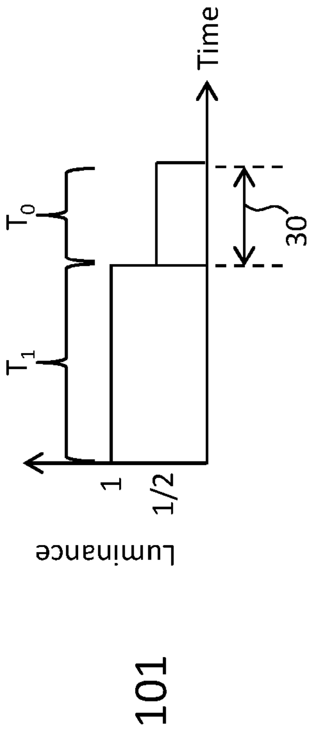
Figure 11G:
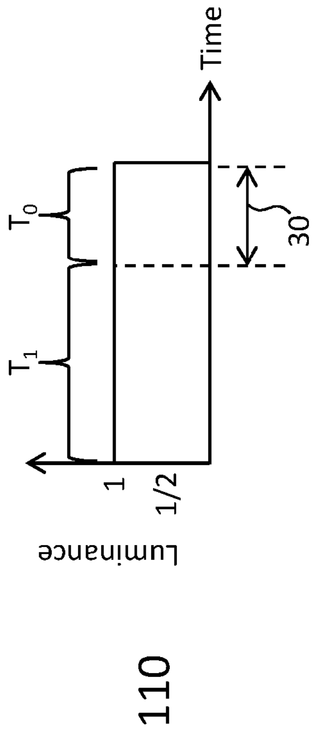

As shown in the timing and luminance diagram of FIG. 11A for a pixel luminance signal 92 of zero, the luminance output for light controller 20 is zero for all pulse periods. As shown in FIG. 11B for a pixel luminance signal 92 of one, the luminance output for light controller 20 is at a constant first power of zero for the first time period (e.g., pulse) corresponding to temporal bit $T_1$ and at a constant second power of ½ for the second time period corresponding to temporal bit $T_0$. As shown in FIG. 11C1 for a pixel luminance signal 92 of two, the luminance output for light controller 20 is at a constant first power of zero for the first time period (e.g., pulse) corresponding to temporal bit $T_1$ and at a constant second power of one for the second time period corresponding to temporal bit $T_0$. Equivalently, and as shown in FIG. 11C2 for a pixel luminance signal 92 of two, the luminance output for light controller 20 is at a constant first power of ½ for the first time period (e.g., pulse) corresponding to temporal bit $T_1$ and at a constant second power of zero for the second time period corresponding to temporal bit $T_0$. The example of FIG. 11C1 is more power efficient since a relative power of one is used whereas in FIG. 11C2 a relative power of one half is used. However, the example of FIG. 11C2 can have reduced flicker since light is emitted for a longer duration of time with fewer light-output interruptions. As shown in FIG. 11D for a pixel luminance signal 92 of three, the luminance output for light controller 20 is at a constant first power of ½ for the first time period (e.g., pulse) corresponding to temporal bit $T_1$ and at a constant second power of ½ for the second time period corresponding to temporal bit $T_0$. As shown in FIG. 11E1 for a pixel luminance signal 92 of four, the luminance output for light controller 20 is at a constant first power of one for the first time period (e.g., pulse) corresponding to temporal bit $T_1$ and at a constant second power of zero for the second time period corresponding to temporal bit $T_0$. As shown in the alternative of FIG. 11E2 for a pixel luminance signal 92 of four, the luminance output for light controller 20 is at a constant first power of for the first time period (e.g., pulse) corresponding to temporal bit $T_1$ and at a constant second power of one for the second time period corresponding to temporal bit $T_0$. As shown in FIG. 11F for a pixel luminance signal 92 of five, the luminance output for light controller 20 is at a constant first power of one for the first time period (e.g., pulse) corresponding to temporal bit $T_1$ and at a constant second power of ½ for the second time period corresponding to temporal bit $T_0$. As shown in FIG. 11G for a pixel luminance signal 92 of six, the luminance output for light controller 20 is at a constant first power of zero for the first time period (e.g., pulse) corresponding to temporal bit $T_1$ and at a constant second power of one for the second time period corresponding to temporal bit $T_0$. There is no mechanism for providing a different luminance for a pixel luminance value 92 of seven, since the number of possibly different luminance outputs is six. Thus, some methods (e.g., illustrated in FIGS. 11A-11G) can provide an expanded but more limited gray scale than other methods (e.g., illustrated in FIGS. 3-9D) in the same image frame time as a conventional pulse-width modulation method. The number of gray scale levels can be $2^B-2^P$ non-zero values (e.g., $2^B-2^P+1$ gray levels including zero) where B is the number of bits and P is the number of additional different powers. The example of FIGS. 11A-11G have B=3 and P=1 equaling $2^3-2^1=8-2=6$ non-zero values.

Figure 12A:
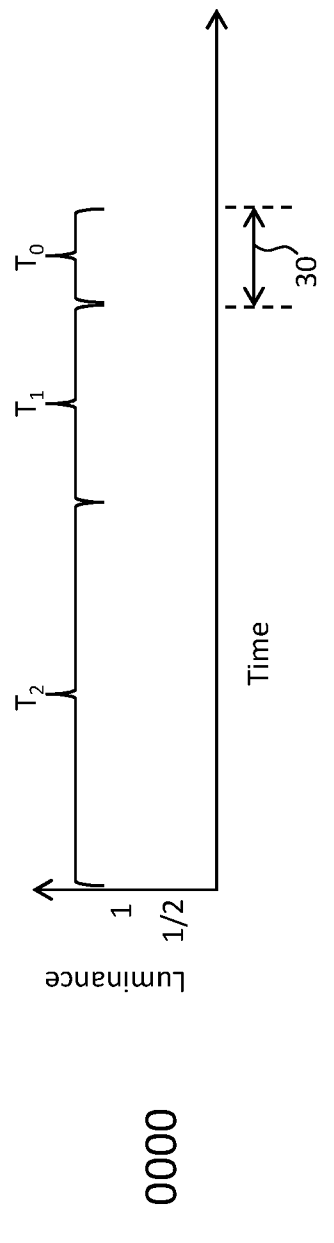
FIGS. 12A-12O show relative luminance output over time for each value of a four-bit pixel luminance signal having one additional power level according to illustrative embodiments of the present disclosure.
Figure 12B:
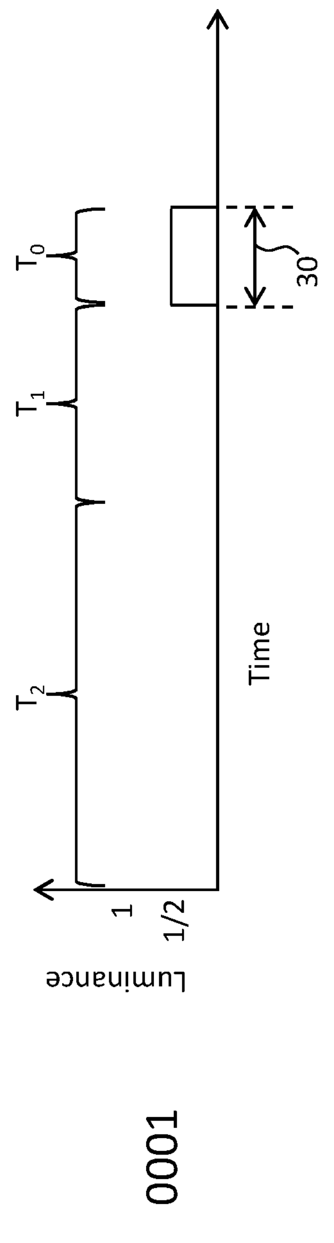
Figure 12F:
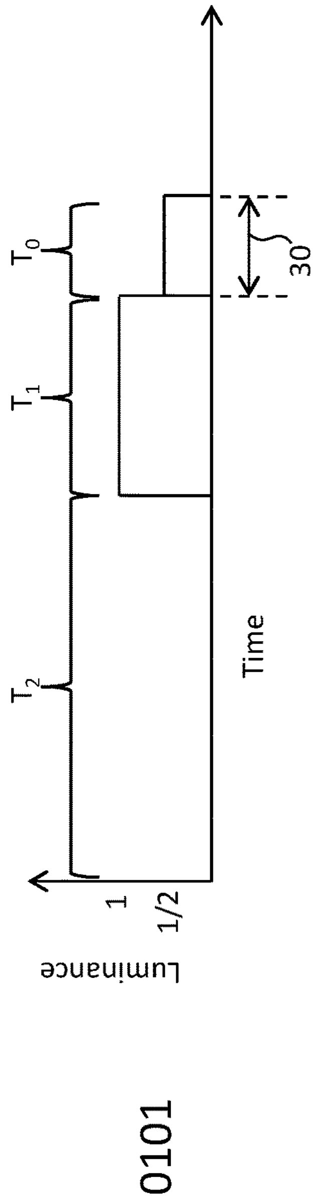
Figure 12F:
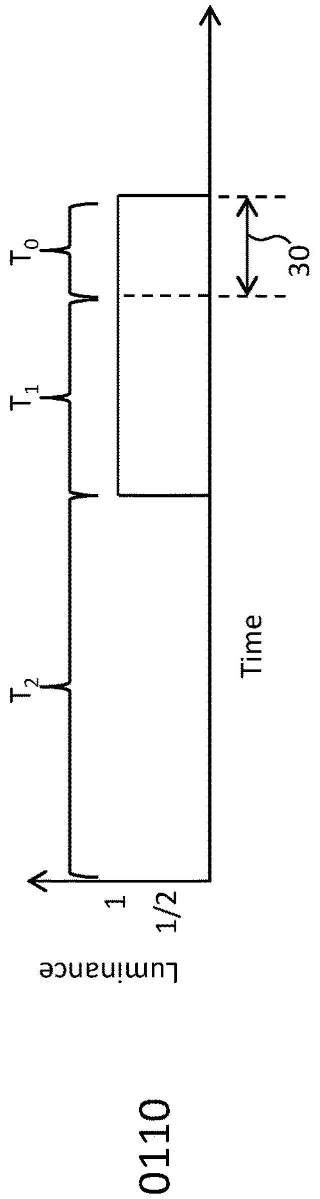
Figure 12F:
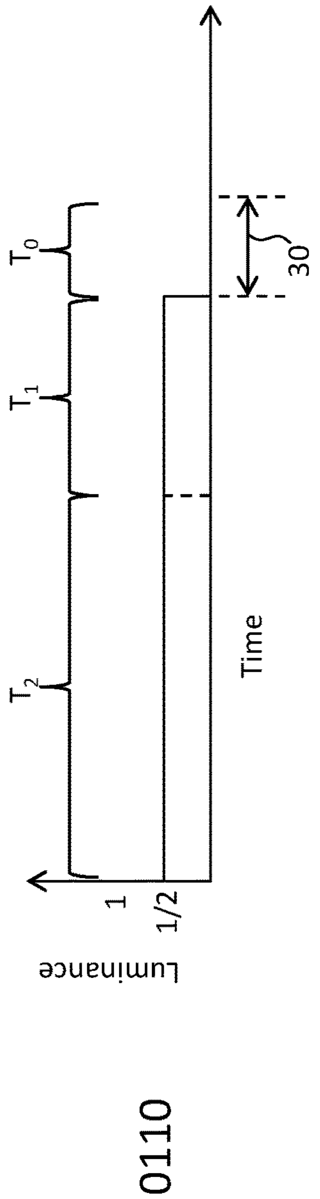
Figure 12H:
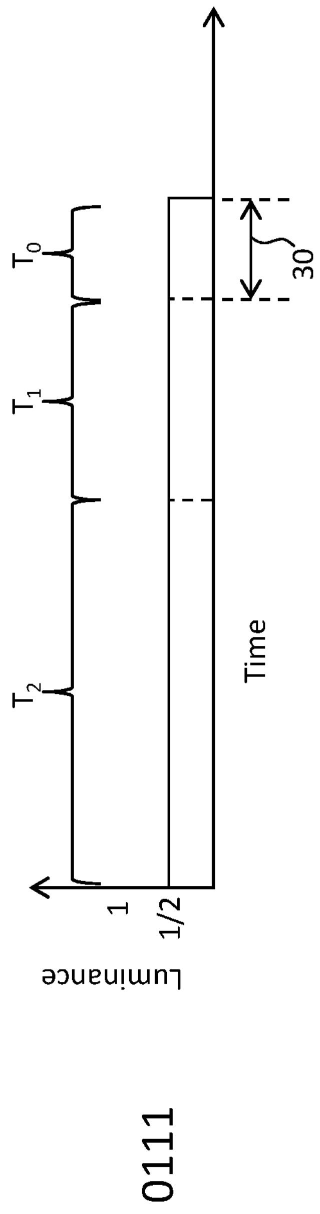
Figure 12I:
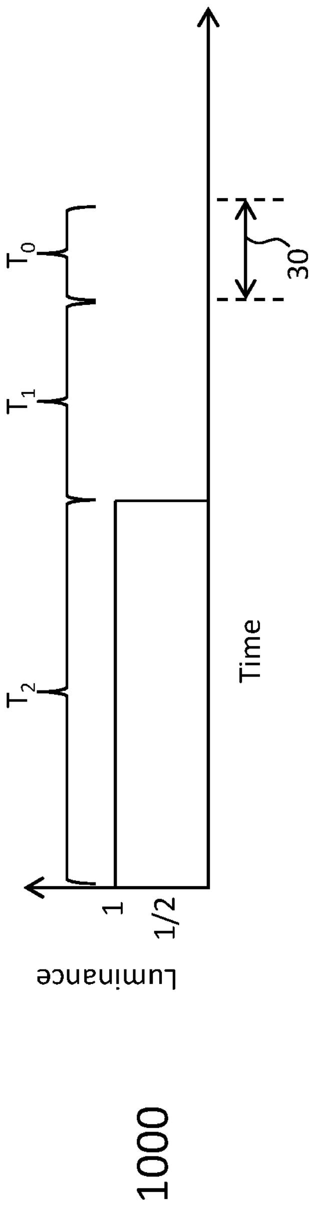
Figure 12J:
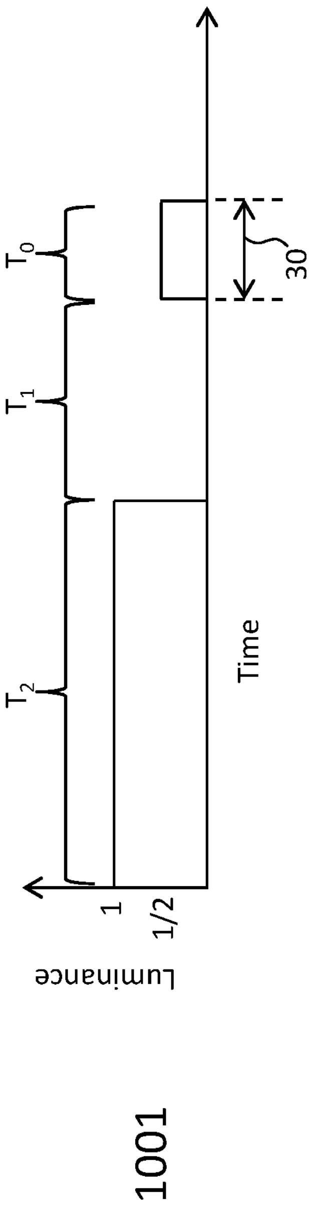
Figure 12K:
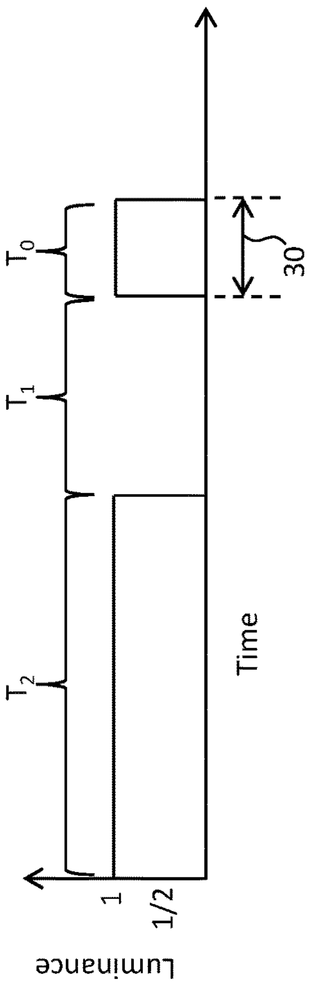
Figure 12L:
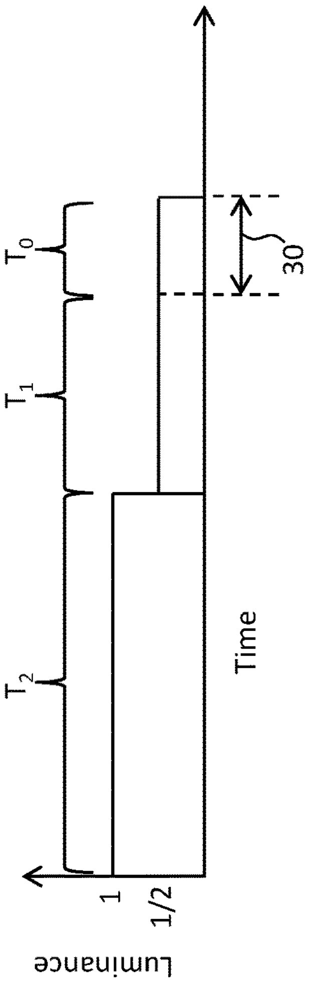
Figure 12M:
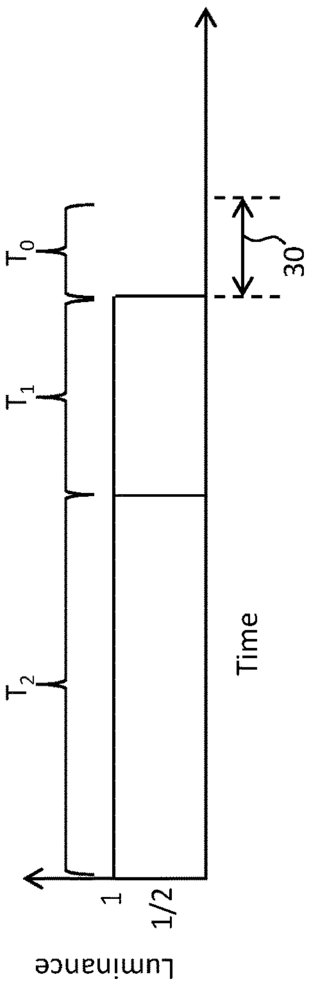
Figure 12N:
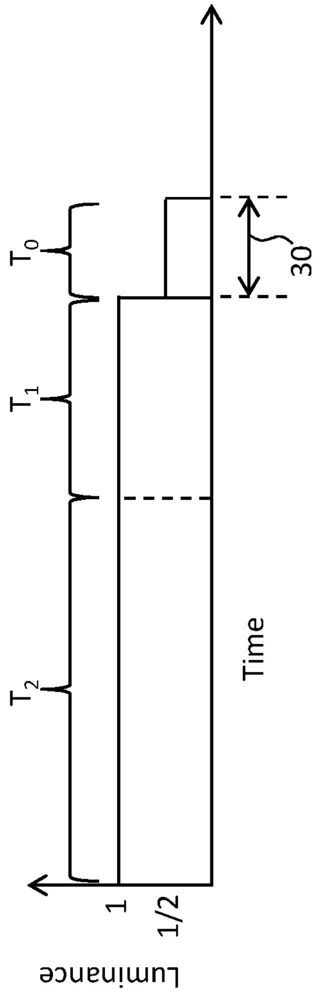
Figure 12O:
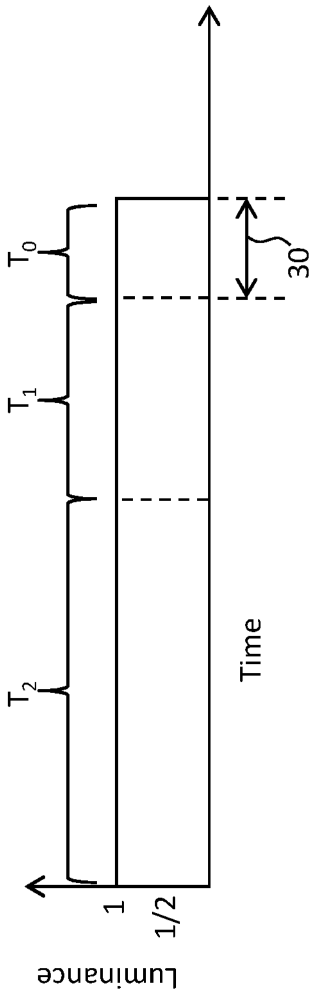

FIGS. 12A-12O illustrate an example of methods having four bits and a frame period equal to three bits for a conventional pulse-width modulation method, so that B=3 and P=1. As shown in the timing and luminance diagram of FIG. 12A for a pixel luminance signal 92 of zero, the luminance output for light controller 20 is zero for all pulse periods. As shown in FIG. 12B for a pixel luminance signal 92 of one ($0001_2$), the luminance output for light controller 20 is at a constant first power of zero for a first time period corresponding to temporal bit $T_2$, the luminance output for light controller 20 is at a constant first power of zero for a first time period corresponding to temporal bit $T_1$, and the luminance output for light controller 20 is at a constant second power of for a second time period corresponding to temporal bit $T_0$. As shown in FIG. 12C1 for a pixel luminance signal 92 of two ($0010_2$), the luminance output for light controller 20 is at a constant first power of zero for a first time period corresponding to temporal bit $T_2$, the luminance output for light controller 20 is at a constant first power of zero for a first time period corresponding to temporal bit $T_1$, and the luminance output for light controller 20 is at a constant second power of one for a second time period corresponding to temporal bit $T_0$. In the alternative embodiment of FIG. 12C2, for a pixel luminance signal 92 of two ($0010_2$), the luminance output for light controller 20 is at a constant first power of zero for a first time period corresponding to temporal bit $T_2$, the luminance output for light controller 20 is at a constant first power of ½ for a second time period corresponding to temporal bit $T_1$, and the luminance output for light controller 20 is at a constant first power of zero for a second time period corresponding to temporal bit $T_0$. As discussed above with respect to FIGS. 11C1 and 11C2, the examples of FIG. 11C1 can be more efficient and the examples of FIG. 11C2 can have reduced flicker. As shown in FIG. 12D for a pixel luminance signal 92 of three ($0011_2$), the luminance output for light controller 20 is at a constant first power of zero for a first time period corresponding to temporal bit $T_2$, the luminance output for light controller 20 is at a constant second power of ½ for a second time period corresponding to temporal bit $T_1$, and the luminance output for light controller 20 is at a constant second power of ½ for a second time period corresponding to temporal bit $T_0$. As shown in FIG. 12E1 for a pixel luminance signal 92 of four ($0100_2$), the luminance output for light controller 20 is at a constant first power of zero for a first time period corresponding to temporal bit $T_2$, the luminance output for light controller 20 is at a constant second power of one for a second time period corresponding to temporal bit $T_1$, and the luminance output for light controller 20 is at a constant first power of zero for a first time period corresponding to temporal bit $T_0$. In an alternative embodiment as shown in FIG. 12E2 for a pixel luminance signal 92 of four ($0100_2$), the luminance output for light controller 20 is at a constant first power of zero for a first time period corresponding to temporal bit $T_2$, the luminance output for light controller 20 is at a constant second power of ½ for a second time period corresponding to temporal bit $T_1$, and the luminance output for light controller 20 is at a constant third power of one for a third time period corresponding to temporal bit $T_0$. As shown in FIG. 12F for a pixel luminance signal 92 of five ($0101_2$), the luminance output for light controller 20 is at a constant first power of zero for a first time period corresponding to temporal bit $T_2$, the luminance output for light controller 20 is at a constant second power of one for a second time period corresponding to temporal bit $T_1$, and the luminance output for light controller 20 is at a constant third power of for a third time period corresponding to temporal bit $T_0$. As shown in FIG. 12G1 for a pixel luminance signal 92 of six ($0110_2$), the luminance output for light controller 20 is at a constant first power of zero for a first time period corresponding to temporal bit $T_2$, the luminance output for light controller 20 is at a constant second power of one for a second time period corresponding to temporal bit $T_1$, and the luminance output for light controller 20 is at a constant second power of one for a second time period corresponding to temporal bit $T_0$. In an alternative embodiment as shown in FIG. 12G2 for a pixel luminance signal 92 of six ($0110_2$), the luminance output for light controller 20 is at a constant first power of ½ for a first time period corresponding to temporal bit $T_2$, the luminance output for light controller 20 is at a constant first power of ½ for a first time period corresponding to temporal bit $T_1$, and the luminance output for light controller 20 is at a constant second power of zero for a second time period corresponding to temporal bit $T_0$. As shown in FIG. 12H for a pixel luminance signal 92 of seven ($0111_2$), the luminance output for light controller 20 is at a constant first power of ½ for a first time period corresponding to temporal bit $T_2$, the luminance output for light controller 20 is at a constant first power of ½ for a first time period corresponding to temporal bit $T_1$, and the luminance output for light controller 20 is at a constant first power of ½ for a first time period corresponding to temporal bit $T_0$.

As shown in FIG. 12I for a pixel luminance signal 92 of eight ($1000_2$), the luminance output for light controller 20 is at a constant first power of one for a first time period corresponding to temporal bit $T_2$, the luminance output for light controller 20 is at a constant second power of zero for a second time period corresponding to temporal bit $T_1$, and the luminance output for light controller 20 is at a constant second power of zero for a second time period corresponding to temporal bit $T_0$. The illustrations of FIGS. 12K-12O are the same as FIGS. 12B-12G1 except that the luminance output for light controller 20 is at a constant first power of one for a first time period corresponding to temporal bit $T_2$. As noted with respect to FIG. 11G, there is no gray scale equivalent for a value of fifteen ($1111_2$).

Figure 13J:
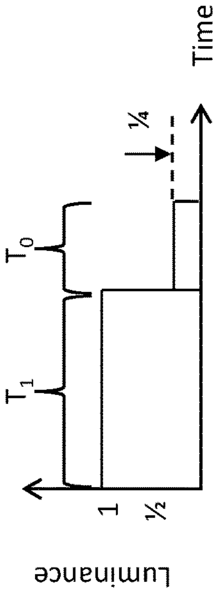
Figure 13K:
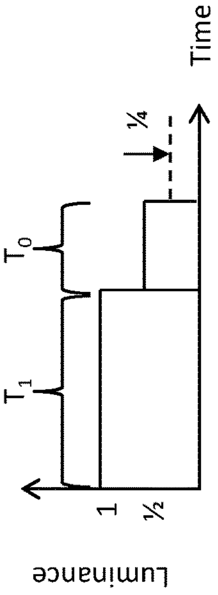
Figure 13L:
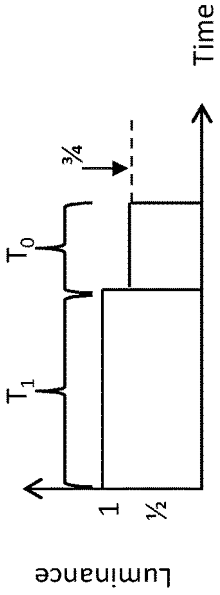
Figure 13M:
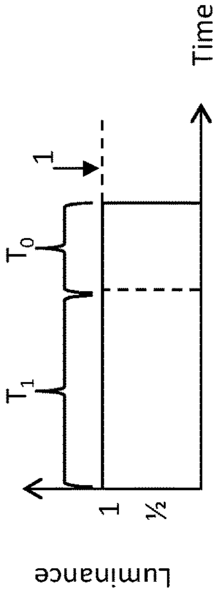

FIGS. 13A-13M illustrate embodiments in which a four-bit value is provided as a pulse-width-modulation signal with frames equal to a conventional two-bit pulse-width-modulation signal by providing five different powers, including zero and one, (e.g., the power necessary to drive light controller 22 to produce a desired different relative luminance). The powers (power levels) can be chosen to provide relative luminances of zero, ¼, ½, ¾, and one. As shown in the timing and luminance diagram of FIG. 13A for a pixel luminance signal 92 of zero, the luminance output for light controller 20 is zero for all pulse periods. As shown in FIG. 13B for a pixel luminance signal 92 of one ($0001_2$), the luminance output for light controller 20 is at a constant first power of zero for a first time period corresponding to temporal bit $T_1$, and the luminance output for light controller 20 is at a constant second power of ¼ for a second time period corresponding to temporal bit $T_0$. As shown in FIG. 13C for a pixel luminance signal 92 of two ($0010_2$), the luminance output for light controller 20 is at a constant first power of zero for a first time period corresponding to temporal bit $T_1$, and the luminance output for light controller 20 is at a constant second power of ½ for a second time period corresponding to temporal bit $T_0$. As shown in FIG. 13D1 for a pixel luminance signal 92 of three ($0011_2$), the luminance output for light controller 20 is at a constant first power of zero for a first time period corresponding to temporal bit $T_1$, and the luminance output for light controller 20 is at a constant second power of ¾ for a second time period corresponding to temporal bit $T_0$. In an alternative embodiment as shown in FIG. 13D2 for a pixel luminance signal 92 of three ($0011_2$), the luminance output for light controller 20 is at a constant first power of ¼ for a first time period corresponding to temporal bit $T_1$, and the luminance output for light controller 20 is at a constant first power of ¼ for a first time period corresponding to temporal bit $T_0$. As shown in FIG. 13E1 for a pixel luminance signal 92 of four ($0100_2$), the luminance output for light controller 20 is at a constant first power of zero for a first time period corresponding to temporal bit $T_1$, and the luminance output for light controller 20 is at a constant second power of one for a second time period corresponding to temporal bit $T_0$. As shown in alternative embodiments shown in FIG. 13E2 for a pixel luminance signal 92 of four ($0100_2$), the luminance output for light controller 20 is at a constant first power of ½ for a first time period corresponding to temporal bit $T_1$, and the luminance output for light controller 20 is at a constant second power of zero for a second time period corresponding to temporal bit $T_0$. As shown in FIG. 13F for a pixel luminance signal 92 of five ($0101_2$), the luminance output for light controller 20 is at a constant first power of ½ for a first time period corresponding to temporal bit $T_1$, and the luminance output for light controller 20 is at a constant second power of ¼ for a second time period corresponding to temporal bit $T_0$. As shown in FIG. 13G1 for a pixel luminance signal 92 of six ($0110_2$), the luminance output for light controller 20 is at a constant first power of ½ for a first time period corresponding to temporal bit $T_1$, and the luminance output for light controller 20 is at a constant first power of for a first time period corresponding to temporal bit $T_0$. In an alternative illustrated in FIG. 13G2 for a pixel luminance signal 92 of six ($0110_2$), the luminance output for light controller 20 is at a constant first power of ¾ for a first time period corresponding to temporal bit $T_1$, and the luminance output for light controller 20 is at a constant second power of zero for a second time period corresponding to temporal bit $T_0$. As shown in FIG. 13H1 for a pixel luminance signal 92 of seven ($0111_2$), the luminance output for light controller 20 is at a constant first power of ½ for a first time period corresponding to temporal bit $T_1$, and the luminance output for light controller 20 is at a constant second power of ¾ for a second time period corresponding to temporal bit $T_0$. In the alternative illustration of FIG. 13H2 for a pixel luminance signal 92 of seven ($0111_2$), the luminance output for light controller 20 is at a constant first power of ¾ for a first time period corresponding to temporal bit $T_1$, and the luminance output for light controller 20 is at a constant second power of ¼ for a second time period corresponding to temporal bit $T_0$. As shown in FIG. 131 for a pixel luminance signal 92 of eight ($1000_2$), the luminance output for light controller 20 is at a constant first power of one for a first time period corresponding to temporal bit $T_1$, and the luminance output for light controller 20 is at a constant second power of zero for a second time period corresponding to temporal bit $T_0$. FIGS. 13J, 13K, 13L, and 13M correspond to FIGS. 13B, 13C, 13D1, and 13E1, respectively except that the luminance output for light controller 20 is at a constant first power of one for a first time period corresponding to temporal bit $T_1$. In some embodiments there is no gray scale equivalent for a value of thirteen ($1101_2$), fourteen ($1110_2$), and fifteen ($1111_2$) as embodiments can be limited to a number of non-zero gray levels equal to $2^B-2^P$ where B is the number of bits and P is the number of additional different powers. The example of FIGS. 13A-13M have B=4 and P=2 equaling $2^4-2^2=16-4=12$ non-zero values.

Figure 14:
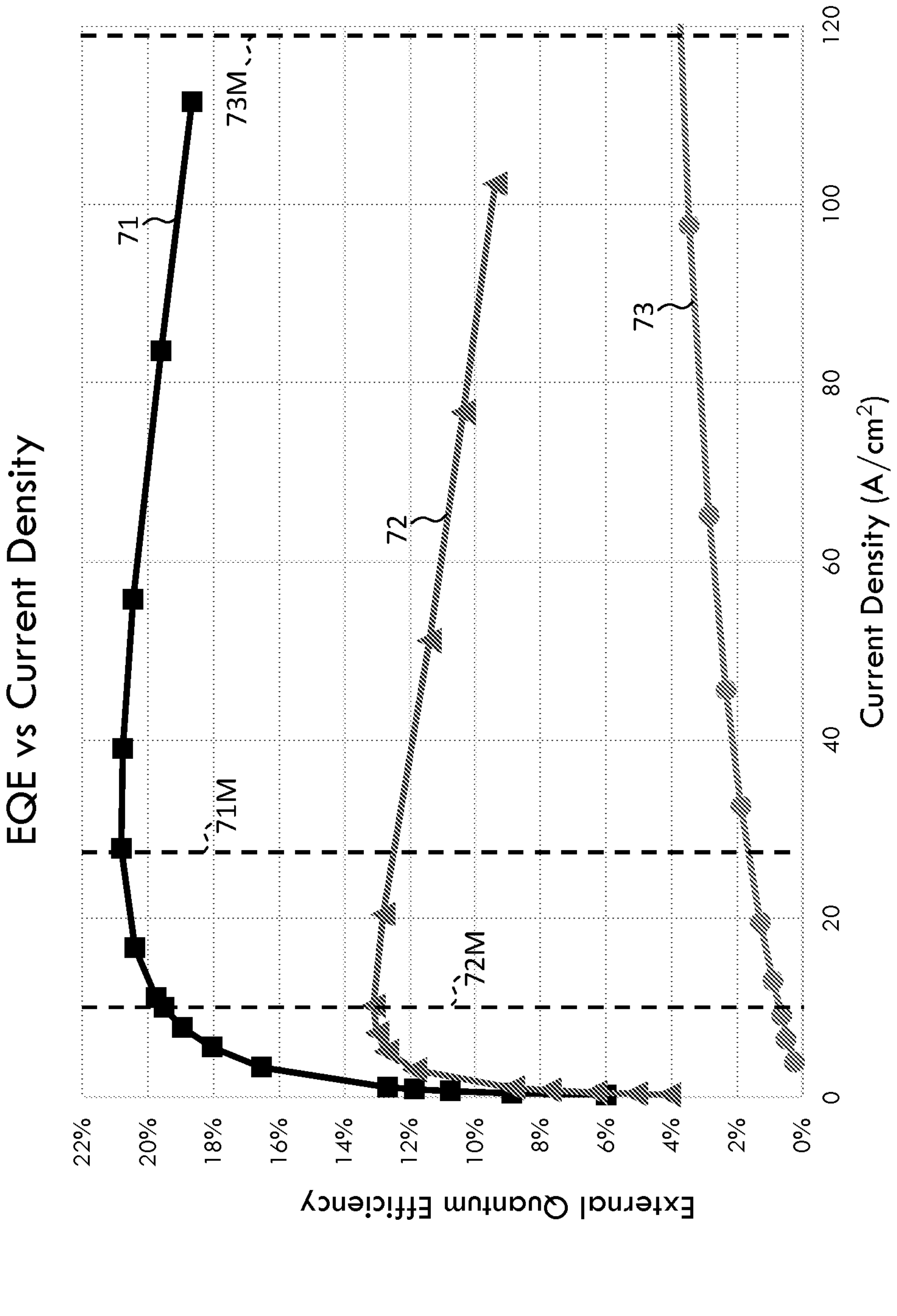
FIG. 14 is a graph showing the efficiency of LEDs at various current densities according to illustrative embodiments of the present disclosure.

Light-emitting diodes (LEDs) can be most efficient when driven at a specific current, as shown in FIG. 14 for given, red, green, and blue inorganic micro-light-emitting diodes. As shown in FIG. 14, a blue-light-emitting LED has a blue efficiency 71 with a blue efficiency maximum 71M, a green-light-emitting LED has a green efficiency 72 with a green efficiency maximum at 72M, and a red-light-emitting LED has a red efficiency 73 with a red efficiency maximum at 73M (off the current density scale of FIG. 14).

LED displays that change the current passing through the LEDs in each pixel to change the luminance of the LEDs will only operate at maximum efficiency at a specific luminance. Thus, such LED displays will only occasionally operate at maximum efficiency. LED displays that operate with desired currents (e.g., the maximum efficiency currents) can be limited in gray-scale resolution because their minimum pulse width 30 time period is too large at a desired image frame rate for a desired control circuit 14 design. According to embodiments of the present disclosure, hybrid pulse-width-modulation pixels 90 provide improved gray-scale resolution at a desired efficiency by operating at a more efficient constant current for first time periods and a less efficient constant current for second time periods, especially when the second time periods are fewer or shorter than the first time periods, or both fewer and shorter. Additional second time periods can be added to a pulse-width-modulation signal or pulse-width-modulation signals can be driven at different powers (e.g., different currents, voltages, or both). For example, in an eight-bit system with one power pulse, the power pulse is only active for one out of 128 pulse periods and, in a twelve-bit system with one power pulse, the power bit is only active for one out of 4096 pulse periods.

Figure 15:
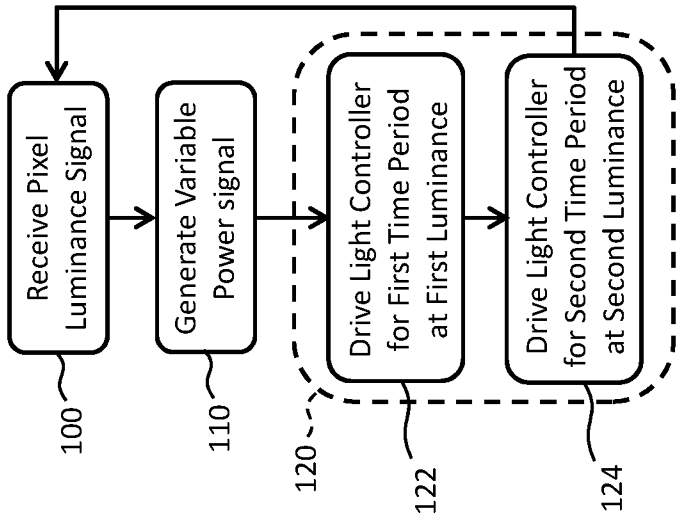
FIG. 15 is a flow diagram of methods according to illustrative embodiments of the present disclosure.

According to embodiments of the present disclosure and as illustrated in the flow diagram of FIG. 15, a method of operating hybrid pulse-width-modulation pixel 90 comprises receiving a pixel luminance signal 92 in step 100 by input circuit 12, generating variable power signal 22 from pixel luminance signal 92 in step 110 by control circuit 14, driving light controller 20 with variable power signal 22 for a first time period at a first luminance in step 122 by drive circuit 18, and driving light controller 20 with variable power signal 22 for a second time period at a second luminance in step 124 by drive circuit 18. The second luminance can be different from the first luminance (unless they are both zero) and can correspond to different first and second powers used to drive light controller 20. The first and second time periods can have the same temporal duration or can have different temporal durations. The first time period can occur before the second time period, or the first time period can occur after the second time period, or the second time period can be provided during the first time period, e.g., between minimum pulse width 30 time period corresponding to a bit in the temporal bits T. Steps 122 and 124 can together drive a light-controller (step 120) having two phases or two portions. In some embodiments, the two portions can be a temporal portion and a power portion. In some embodiments, different powers are output during pulse periods corresponding to different temporal bits T.

According to embodiments of the present disclosure and as shown in FIG. 16, a hybrid pulse-width-modulation-pixel display 94 comprises an array of hybrid pulse-width-modulation pixels 90 disposed on a display substrate 88 connected by wires 86 in an active-matrix configuration controlled by row controller 82 and column controller 84. Display controller 80 provides image data (image frames comprising an array of pixel data for display by the array of hybrid pulse-width-modulation pixels 90) to column controller 84. Row controller 82 selects rows of hybrid pulse-width-modulation pixels 90 and column controller 84 provides the pixel data to each hybrid pulse-width-modulation pixel 90 in the selected row.

Pixel luminance signal 92 can be provided to hybrid pulse-width-modulation pixel 90 by an external controller, for example a display controller 80, a row controller 82, or a column controller 84 connected to directly to hybrid pulse-width-modulation pixels 90 with wires 86, to rows of hybrid pulse-width-modulation pixels 90 with row wires 86, or to columns of hybrid pulse-width-modulation pixels 90 with column wires 86, respectively, for example as is found in active-matrix displays and as shown in FIG. 16. Pixel luminance signal 92 can be a digital signal.

Hybrid pulse-width-modulation-pixel display 94 can be a flat-panel display, for example an organic light-emitting diode display, an inorganic light-emitting diode 21 display, or a liquid crystal display. In some embodiments, switching frequencies are limited, for example by electronic devices and connections, or by switching frequencies for light controllers 20, for example liquid crystal displays that can have liquid crystal switching times in the tens of milliseconds. In such displays, a hybrid pulse-width-modulation-pixel display 94 can provide improved image frame rates or gray-scale resolution, or both.

Control circuits 14, input circuits 12, and drive circuits 18 can be constructed using analog or digital circuits, for example employing digital, analog, or mixed-signal integrated circuits disposed on a display substrate 88 or on pixel modules disposed on a display substrate 88.

Hybrid pulse-width-modulation-pixel display 94 can be a multi-color display with multiple different light controllers 20, for example red light-emitting diodes that emit red light, green light-emitting diodes that emit green light, and blue light-emitting diodes that emit blue light. Pixel luminance signal 92 can be a digital signal, for example a binary weighted digital signal and can comprise pixel data for each color of light emitted by hybrid pulse-width-modulation pixels 90, for example red, green and blue light emitted by corresponding the red, green, and blue light controllers 20. Pixel controller 10 can calculate variable power signals 22 for each color of light and drive circuit 18 can provide power (e.g., current or voltage) signals to each light controller 20 in hybrid pulse-width-modulation pixels 90.

Light controller 20 can be any device or circuit that controls the emission of light from hybrid pulse-width-modulation pixel 90, for example a liquid crystal pixel with a backlight, an organic light-emitting diode pixel, or an inorganic light-emitting diode 21 pixel. Hybrid pulse-width-modulation pixel 90 can comprise multiple light controllers 20, for example a red-light controller that emits red light, a green-light controller that emits green light, and blue-light controller that emits blue light, collectively light controllers 20. Embodiments of the present disclosure can include one or more pixel controllers 10 that control multiple light controllers 20 and can receive multiple pixel luminance signals 92 for the multiple light controllers 20.

Light controllers 20 can be light-emitting diodes (e.g., inorganic light emitting diodes 21 such as micro-transfer printed micro-inorganic-light-emitting diode or organic light-emitting diodes) that can switch very rapidly between an on-state and an off-state (e.g., within a few micro-seconds, one micro-second, or less than a micro-second) in response to a digital control signal (e.g., either on at a fixed voltage and constant current emitting light or off and not emitting light at, for example, zero volts). The human visual system averages the light emitted during the minimum pulse width 30 time period in each display image frame to perceive an average brightness during the display frame if the pulses are sufficiently fast and short. In contrast, light emitters in displays driven by a variable voltage or variable current displays are on for the entire display frame but at a brightness dependent on the voltage or current supplied to the light emitters. Light-emitting diodes can have variable efficiency depending on the voltage or current supplied; thus light-emitting diodes driven at a constant current and voltage for variable amounts of time specified by temporal bits T, and according to embodiments of the present disclosure, can be more power efficient by operating at or near peak efficiency during the temporal pulses.

Inorganic light-emitting diodes (iLEDs) 21 can operate most efficiently at a given current. Moreover, different types of iLEDs or iLEDs that emit different colors of light can operate most efficiently at different constant currents or different voltages and can be driven at different constant currents for variable time periods. When light controller 20 is off, no current flows to light controller 20. When light controller 20 is on, ideally a constant, unvarying current at a fixed voltage flows to the operational light controller 20. According to some embodiments of the present disclosure, a PWM circuit can control each (e.g., respective) light controller 20 in each hybrid pulse-width-modulation pixel 90 in an active-matrix hybrid pulse-width-modulation-pixel display 94 comprising an array of hybrid pulse-width-modulation pixels 90, for example with a different desired constant current and voltage. When operational, light controller 20 emits light at a constant luminance. If light controller 20 is turned on and off quickly, the human visual system cannot perceive the switching and instead perceives a variable brightness depending on the amount of time the light emitter is on at the predetermined constant luminance.

Drive circuit 18 can comprise an effectively binary digital switch fed by a constant-current supply because it does not continuously modulate the amount of current supplied by the constant-current supply but rather operates in a first mode in which light controller 20 is turned off (e.g., at a zero voltage) and no current flows through light controller 20 and a second mode in which the current flows through light controller 20 at a designed constant current and non-zero voltage specified by the constant-current supply. The constant amount of current (or voltage) can be selected in response to power bits P and, depending on the circuit design, controlled by a current supply circuit controller 14, or drive circuit 18. Thus, the constant-current supply circuit has selectable constant currents that can be selected to provide various different desired constant currents. Drive circuit 18 does not function as an analog switch or amplifier and does not continuously modulate the current passing through light controller(s) 20, for example does not provide an amount of current greater than zero and less than the current supplied by the constant-current supply at whatever levels are specified by variable power signal 22, within circuit design and manufacturing capabilities. Thus, the voltage and current supplied to light controllers 20 can be digital and binary (e.g., has two levels including zero) for temporal bits T, digital and binary pixel luminance signals 92 having a single power bit P not including zero, digital and quaternary for pixel luminance signals 92 having a two power bits P not including zero, and generally has $2^P$ power levels (not including zero) for pixel luminance signals 92 having P power bits. In some embodiments, power corresponding to temporal bits T can have two power levels, three power levels, four power levels, five power levels, or nine power levels (including zero).

Certain embodiments of the present disclosure can be applied to active-matrix inorganic light-emitting diode 21 hybrid pulse-width-modulation-pixel displays 94. For example, display control signals from display controller 80 can comprise a row-control signal provided on a row wire 86 and a column-data signal provided on a column wire 86 and electrically connected to an array of hybrid pulse-width-modulation pixels 90 arranged in rows and columns on a display substrate 88 in an active-matrix hybrid pulse-width-modulation-pixel display 94. Each hybrid pulse-width-modulation pixel 90 can comprise one or multiple light controllers 20, each of which can comprise, for example, a micro-inorganic-light-emitting diode. Each of multiple light controllers 20 in a hybrid pulse-width-modulation pixel 90 can be or include a different inorganic light-emitting diode 21 that emits a different color of light when provided with electrical current at a suitable voltage.

According to some embodiments of the present disclosure, pixel controller 10 can comprise any of a variety of transistors, for example transistors such as those known in the electronics, integrated circuit, and display industries. Transistors can be thin-film transistors (TFTs), for example amorphous transistors or polysilicon transistors and can be a semiconductor thin-film circuit formed on a substrate, such as a display substrate 88. In some embodiments, transistors are crystalline silicon or compound semiconductor transistors, for example made in an integrated circuit process and can be transfer printed onto a display substrate 88 or onto a pixel module substrate that is transfer printed onto display substrate 88. Such transfer-printed structure can comprise fractured or separated tethers.

According to some embodiments of the present disclosure, light controllers 20 are micro-inorganic-light-emitting diodes (micro-iLEDs) with at least one of a width and a length that is no greater than 500 microns (e.g., no greater than 200 microns, no greater than 100 microns, no greater than 50 microns, no greater than 25 microns, no greater than 15 microns, no greater than 12 microns, no greater than 8 microns, or no greater than 5 microns). Micro-LEDs provide an advantage according to some embodiments of the present disclosure since they are sufficiently small and can be disposed spatially close together so that the different micro-LEDs in a hybrid pulse-width-modulation pixel 90 cannot be readily distinguished by the human visual system in a display at a desired viewing distance, improving color mixing of light emitted by hybrid pulse-width-modulation pixel 90 and providing apparent improvements in display resolution. Embodiments of the present disclosure can be constructed using micro-transfer printing.

Methods of forming useful micro-transfer printable structures are described, for example, in the paper *AMOLED Displays using Transfer-Printed Integrated Circuits, Journal of the SID,* 19(4), 2012, and U.S. Pat. No. 8,889,485. For a discussion of micro-transfer printing techniques see, U.S. Pat. Nos. 8,722,458, 7,622,367 and 8,506,867, the disclosures of which are hereby incorporated by reference in their entirety. Micro-transfer printing using compound micro-assembly structures and methods can also be used with the present disclosure, for example, as described in U.S. patent application Ser. No. 14/822,868, filed Aug. 10, 2015, entitled Compound Micro-Assembly Strategies and Devices, the disclosure of which is hereby incorporated by reference in its entirety. In some embodiments, pixels are compound micro-assembled devices.

As is understood by those skilled in the art, the terms "over" and "under", "above" and "below", and "top" and "bottom" are relative terms and can be interchanged in reference to different orientations of the layers, elements, and substrates included in the present invention. For example, a first layer on a second layer, in some implementations means a first layer directly on and in contact with a second layer. In other implementations a first layer on a second layer includes a first layer and a second layer with another layer therebetween.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously.

Having expressly described certain embodiments, it will now become apparent to one skilled in the art that other embodiments incorporating the concepts of the disclosure may be used. Therefore, the claimed invention should not be limited to the described embodiments, but rather should be limited only by the spirit and scope of the following claims.

PARTS LIST

B bit of multiple bits
P power bit
T temporal bit
10 pixel controller
12 input circuit
14 control circuit
14A timing signal
14B control power signal
16 memory
18 drive circuit
20 light controller
21 inorganic light-emitting diode
22 variable power signal
30 minimum pulse width/least-significant bit period
71 blue efficiency vs. current density/blue efficiency
71M blue efficiency maximum
72 green efficiency vs. current density/green efficiency
72M green efficiency maximum
73 red efficiency vs. current density/red efficiency
73M red efficiency maximum
80 display controller
82 row controller
84 column controller
86 wires
88 display substrate
90 hybrid pulse-width-modulation pixel
92 pixel luminance signal
94 hybrid pulse-width-modulation-pixel display
100 receive pixel luminance signal step
110 generate variable power signals step
120 drive light controller step
122 drive light controller for first time period at first luminance step
124 drive light controller for second time period at second luminance step

The invention claimed is:

1. A hybrid pulse-width-modulation pixel, comprising:
a light controller for providing light; and
a pixel controller operable to (i) receive a pixel luminance signal comprising multiple bits specifying a desired light-controller luminance for a frame period, (ii) generate a digital variable power signal in response to the pixel luminance signal, and (iii) drive the light controller to provide the light at different constant luminances using different constant non-zero amounts of power for different time periods within the frame period by providing the digital variable power signal to the light controller.

2. The hybrid pulse-width-modulation pixel of claim 1, wherein the variable power signal specifies (i) a pulse-width-modulation signal having one or more pulse periods during which the constant first power is provided and (ii) a power signal for the second time period.

3. The hybrid pulse-width-modulation pixel of claim 2, wherein the pulse-width-modulation signal has a minimum pulse width and the second time period is substantially no less than the minimum pulse width.

4. The hybrid pulse-width-modulation pixel of claim 2, wherein the pulse-width-modulation signal has a minimum pulse width and the second time period is substantially equal to the minimum pulse width.

5. The hybrid pulse-width-modulation pixel of claim 2, wherein the pixel controller is operable to provide the variable power signal at the constant second power for a third time period.

6. The hybrid pulse-width-modulation pixel of claim 1, wherein the variable power signal specifies a pulse-width-modulation signal comprising a first pulse period and a second pulse period having different temporal durations and the pixel controller is operable to provide the variable power signal at the constant first power for the first pulse period and the constant second power for the second pulse period.

7. The hybrid pulse-width-modulation pixel of claim 1, wherein the first time period is greater than the second time period.

8. The hybrid pulse-width-modulation pixel of claim 1, wherein the multiple bits comprise one or more power bits and wherein (i) the one or more power bits are one power bit and the constant second power drives the light controller to provide light at a luminance substantially one half of the luminance at which the constant first power drives the light controller, (ii) the one or more power bits are two power bits and the pixel controller is operable to provide the variable power signal with four different amounts of power that drive the light controller to provide light at four different corresponding luminances, or (iii) the one or more power bits are three power bits and the pixel controller is operable to provide the variable power signal with eight different amounts of power that drive the light controller to provide light at eight different corresponding luminances.

9. The hybrid pulse-width-modulation pixel of claim 1, wherein the multiple bits comprise P power bits, and the pixel controller is operable to provide the variable power signal with $2^P$ different constant amounts of power that drive the light controller to provide light at $2^P$ different corresponding constant luminances.

10. The hybrid pulse-width-modulation pixel of claim 9, wherein the $2^P$ different corresponding constant luminances correspond to a binary weighted value of the power bits.

11. The hybrid pulse-width-modulation pixel of claim 1, wherein the constant first power drives the light controller more efficiently than the constant second power drives the light controller.

12. The hybrid pulse-width-modulation pixel of claim 1, wherein:
some of the multiple bits are temporal bits and a remainder of the multiple bits are one or more power bits,
the pixel controller is operable to provide the variable power signal at the constant first power for the first time period corresponding to a value of the temporal bits, and the pixel controller is operable to provide the variable power signal at the constant second power corresponding to a value of the one or more power bits for the second time period.

13. The hybrid pulse-width-modulation pixel of claim 12, wherein the one or more power bits are one or more least-significant bits in the multiple bits.

14. The hybrid pulse-width-modulation pixel of claim 1, wherein the pixel controller is operable to provide the variable power signal at the constant second power for the second time period after providing the variable power signal at the constant first power for the first time period.

15. The hybrid pulse-width-modulation pixel of claim 1, wherein the pixel controller is operable to provide the variable power signal at the constant second power for the second time period before providing the variable power signal at the constant first power for the first time period.

16. The hybrid pulse-width-modulation pixel of claim 1, wherein the first time period has a first temporal portion and a second temporal portion and the pixel controller is operable to provide the variable power signal at the constant second power for the second time period between providing the variable power signal at the constant first power for the first temporal portion and providing the variable power signal at the constant first power for the second temporal portion.

17. The hybrid pulse-width-modulation pixel of claim 1, comprising a drive circuit operable to drive the light controller, wherein the drive circuit comprises a constant-current power-supply circuit operable to supply two, four, eight, sixteen, or more different constant currents at a desired voltage.

18. The hybrid pulse-width-modulation pixel of claim 1, wherein the light controller is an organic light-emitting diode or an inorganic light-emitting diode.

19. A hybrid pulse-width-modulation-pixel display comprising an array of hybrid pulse-width-modulation pixels according to claim 1.

20. A method of operating a hybrid pulse-width-modulation pixel according to claim 1, the method comprising, with the pixel controller:

receiving the pixel luminance signal;

generating the variable power signal in response to the pixel luminance signal; and driving the light controller to provide light responsive to the variable power signal for variable time periods by providing the variable power signal at the constant first power for the first time period, and providing the variable power signal at the constant second power for the second time period.

* * * * *